United States Patent [19]
Bland et al.

[11] Patent Number: 4,993,979
[45] Date of Patent: Feb. 19, 1991

[54] MARINE PROPULSION DEVICE

[75] Inventors: Gerald F. Bland, Glenview; James C. Kantola, Waukegan; Martin J. Mondek, Wonder Lake; Lawrence E. Zdanowicz, Waukegan, all of Ill.

[73] Assignee: Outboard Marine Corporation, Waukegan, Ill.

[21] Appl. No.: 351,441

[22] Filed: May 12, 1989

[51] Int. Cl.⁵ .............................................. B63H 23/04
[52] U.S. Cl. .................... 440/75; 123/196 W; 184/6.120; 184/6.180; 184/6.280; 384/322; 384/368; 384/415; 440/88
[58] Field of Search ................. 440/75, 88; 184/6.12, 184/6.18, 6.28; 384/322, 368, 369, 370, 371, 415; 123/196 W

[56] References Cited

U.S. PATENT DOCUMENTS

| | | | |
|---|---|---|---|
| 2,700,359 | 1/1955 | Dewhurst | 440/88 X |
| 2,918,986 | 12/1959 | Leipert | 184/6.18 |
| 3,006,311 | 10/1961 | Hansson et al. | 115/35 |
| 3,042,146 | 7/1962 | Shimanckas | 184/6.18 |
| 3,478,620 | 11/1969 | Shimanckas | 440/75 |
| 3,647,024 | 3/1972 | Wick | 384/415 X |
| 3,799,291 | 3/1974 | Becker | 184/6.18 |
| 3,931,783 | 1/1976 | Croisant | 115/34 R |
| 3,931,882 | 3/1969 | Irgens | 440/88 |
| 4,382,797 | 5/1983 | Blanchard | 440/75 X |
| 4,397,198 | 8/1983 | Borgersen et al. | 440/75 X |
| 4,565,534 | 1/1986 | Bland | 440/88 |
| 4,592,733 | 6/1986 | Bland | 440/88 |
| 4,650,430 | 3/1987 | Schiek | 440/88 |
| 4,699,598 | 10/1987 | Bland et al. | 440/88 |
| 4,744,153 | 5/1988 | Brand | 33/517 |
| 4,764,135 | 8/1988 | McCormick | 440/83 |

FOREIGN PATENT DOCUMENTS 649901 10/1962 Canada .............................. 440/88

Primary Examiner—Sherman Basinger
Attorney, Agent, or Firm—Michael, Best & Friedrich

[57] ABSTRACT

A marine propulsion device comprising a gear housing adapted to be mounted on a transom of a boat, a first gear rotatably supported by the gear housing and adapted to be driven by an engine, a second gear which is rotatably supported by the gear housing, which is driven by the first gear and which is adapted to be drivingly connected to a propeller, a third gear driven by the second gear, and an arrangement for lubricating the third gear.

25 Claims, 11 Drawing Sheets

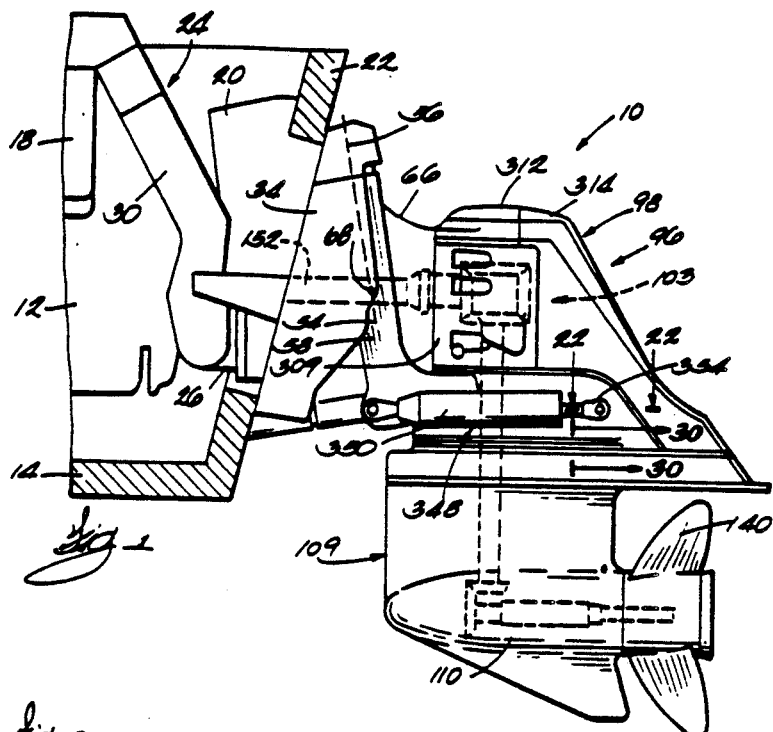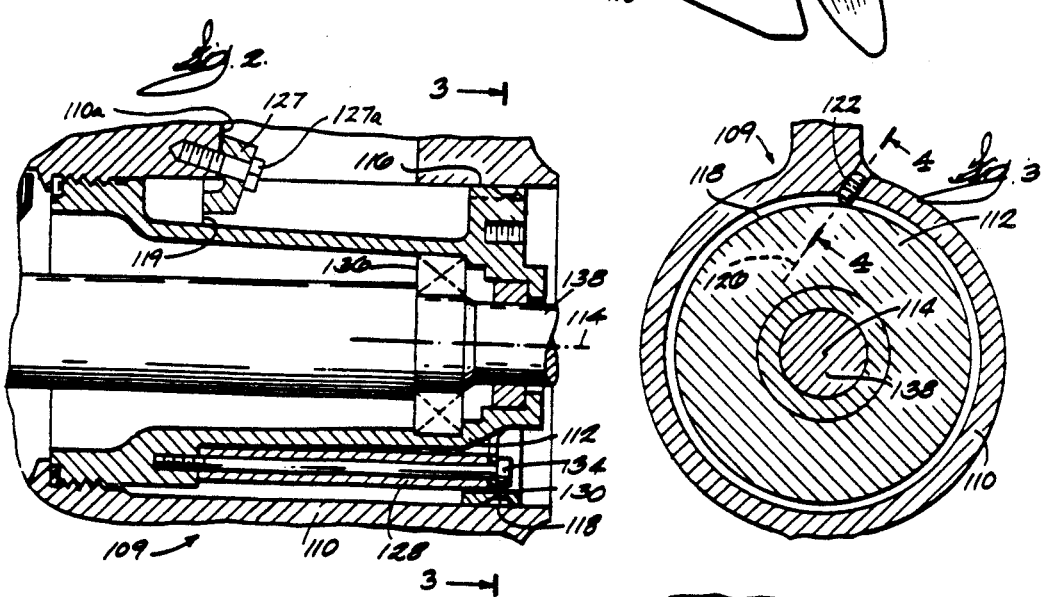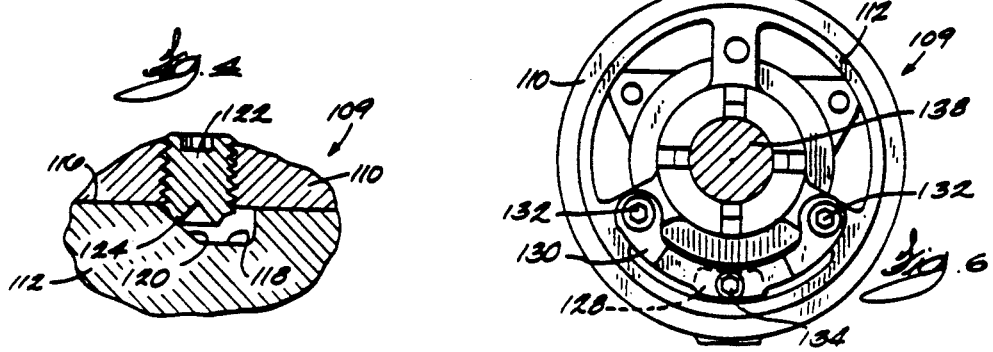

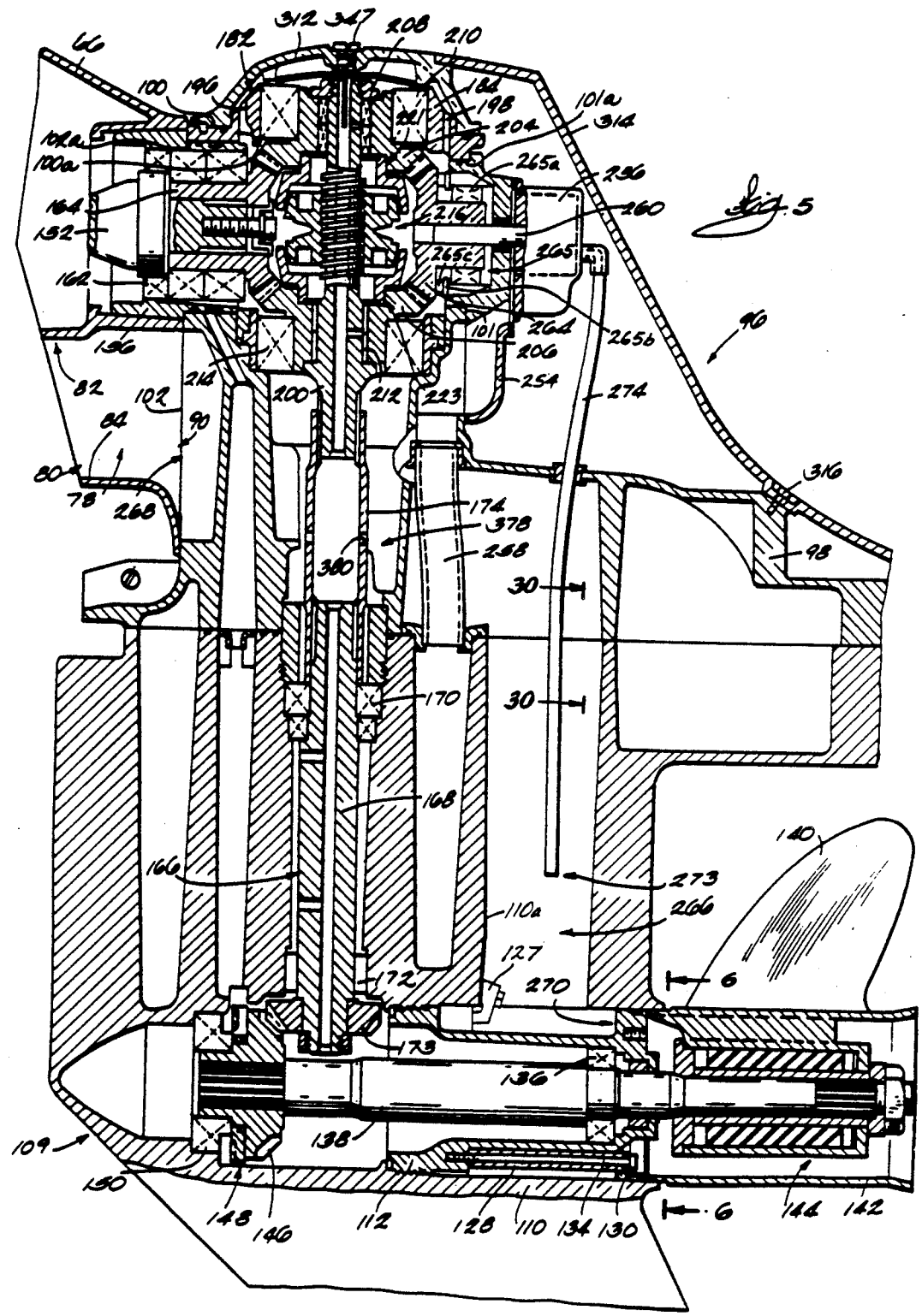

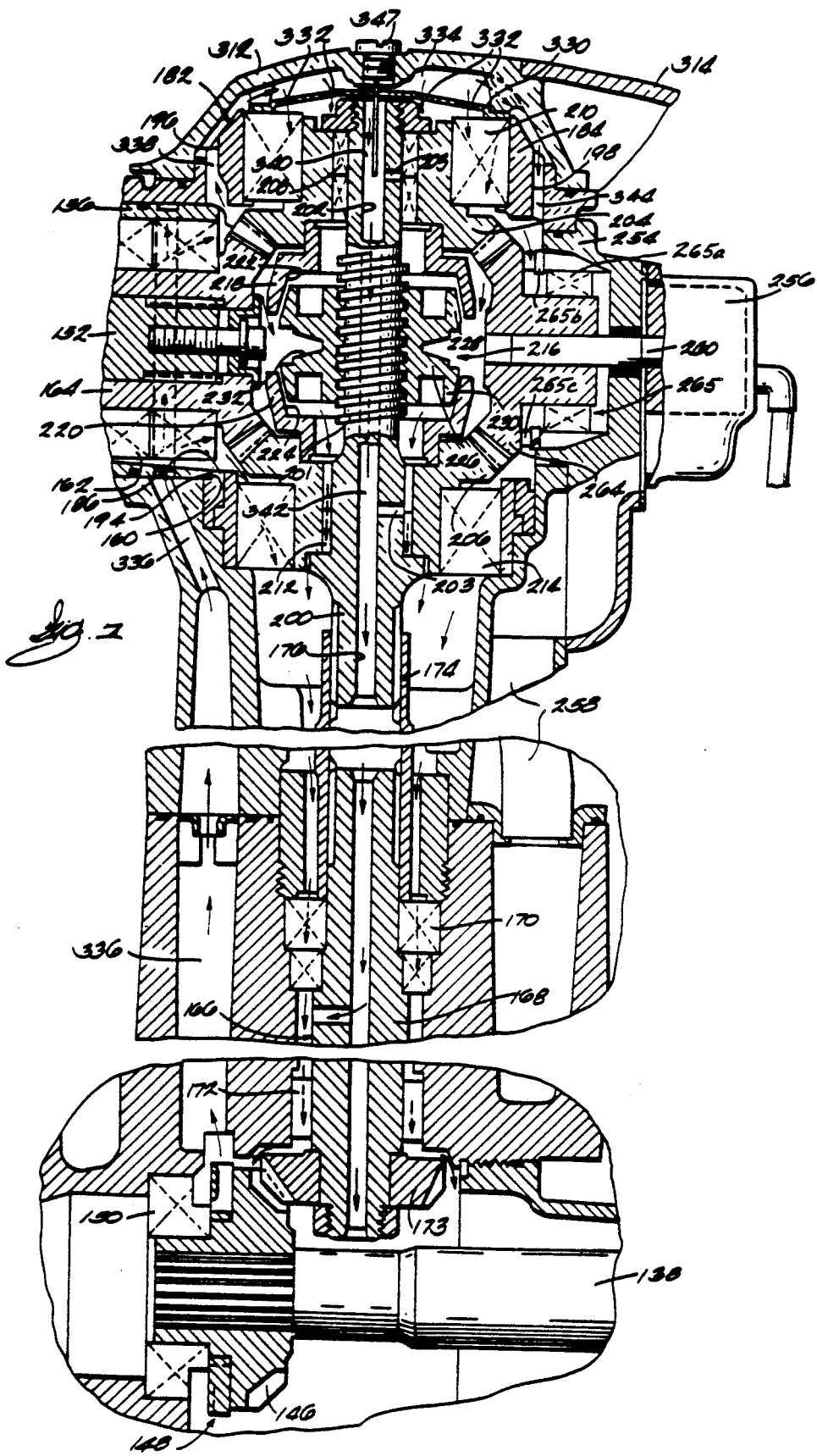

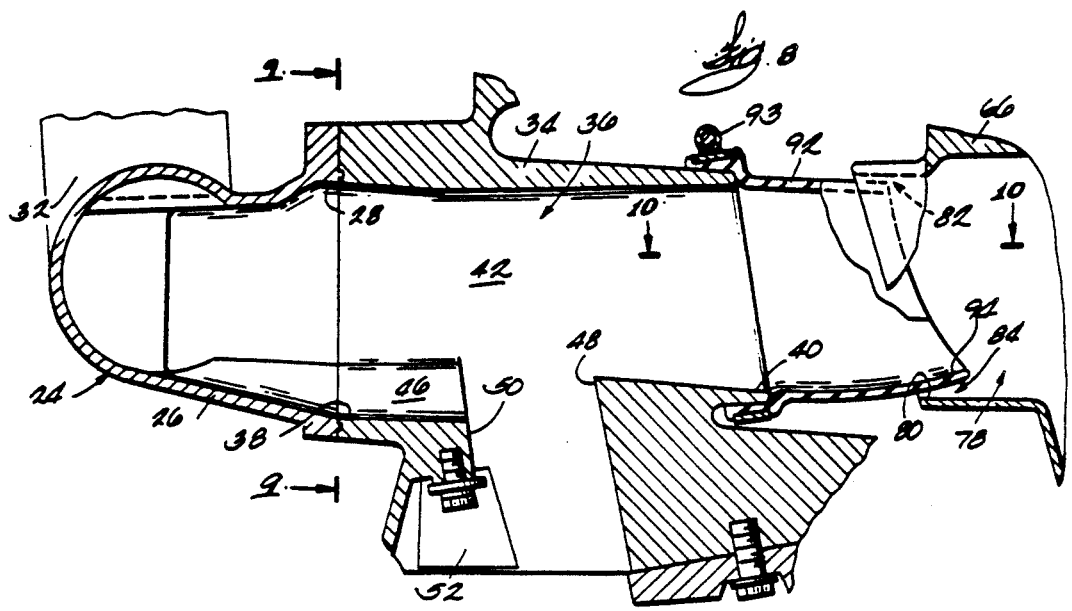
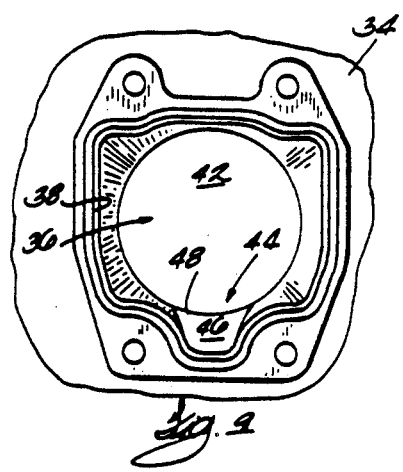
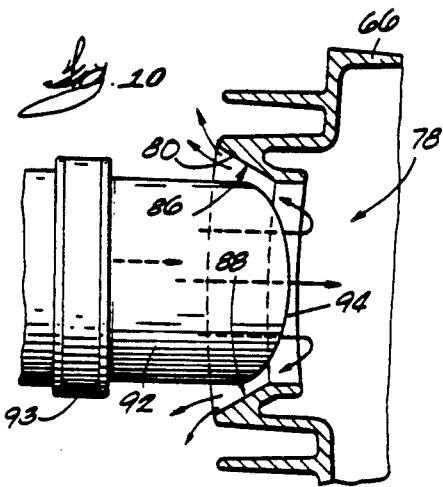
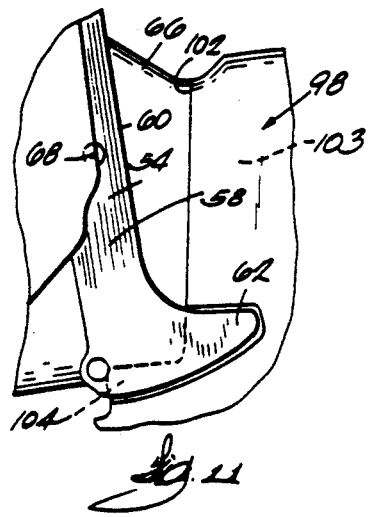
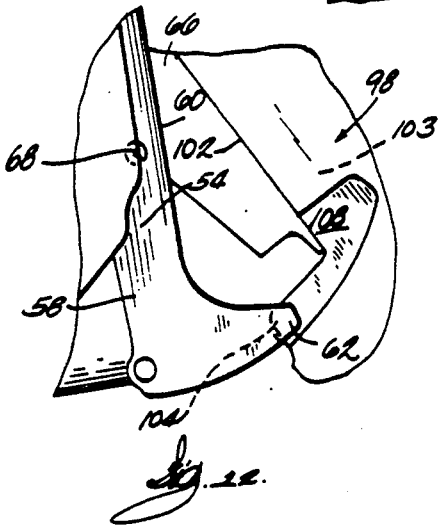

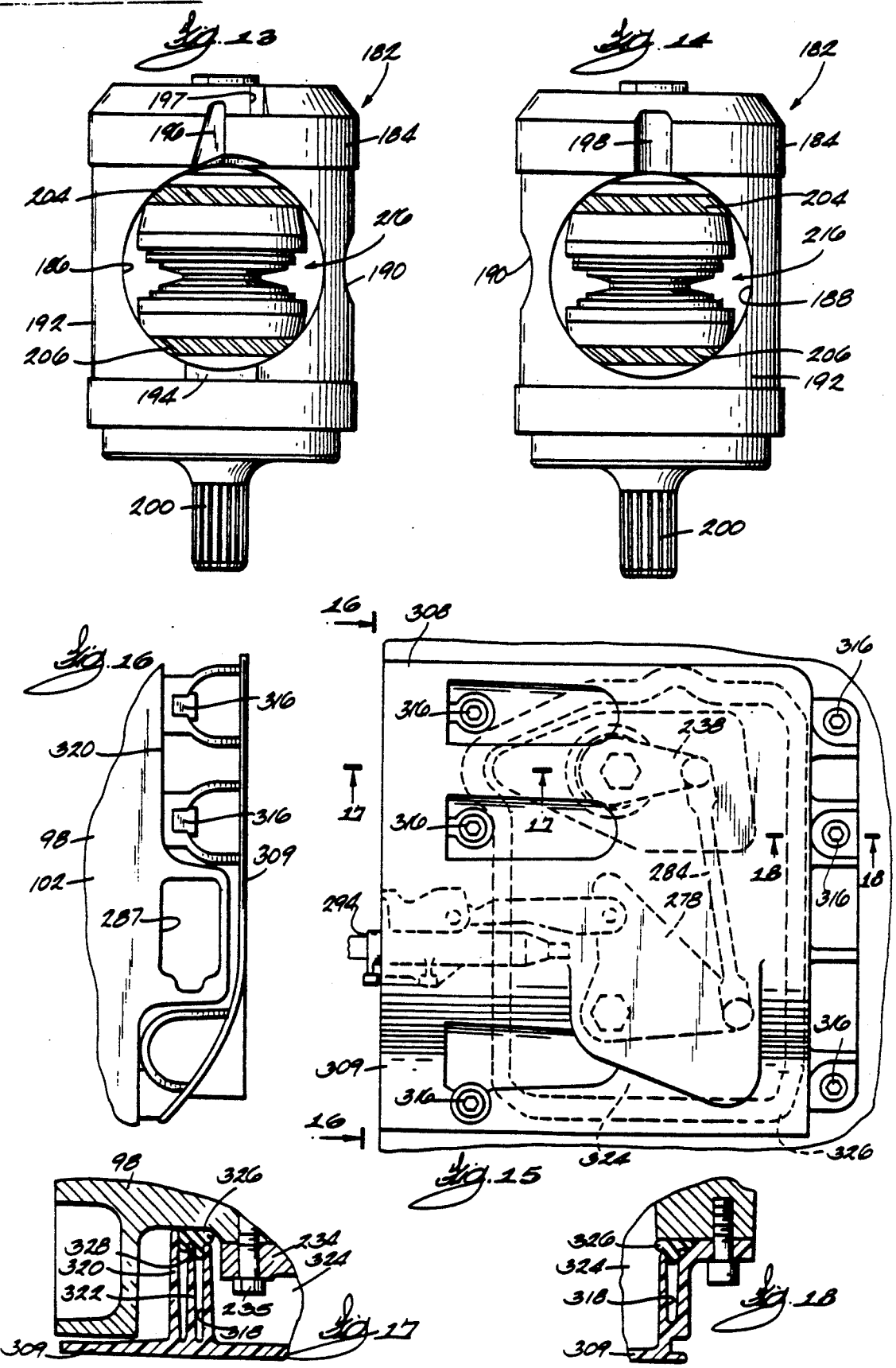

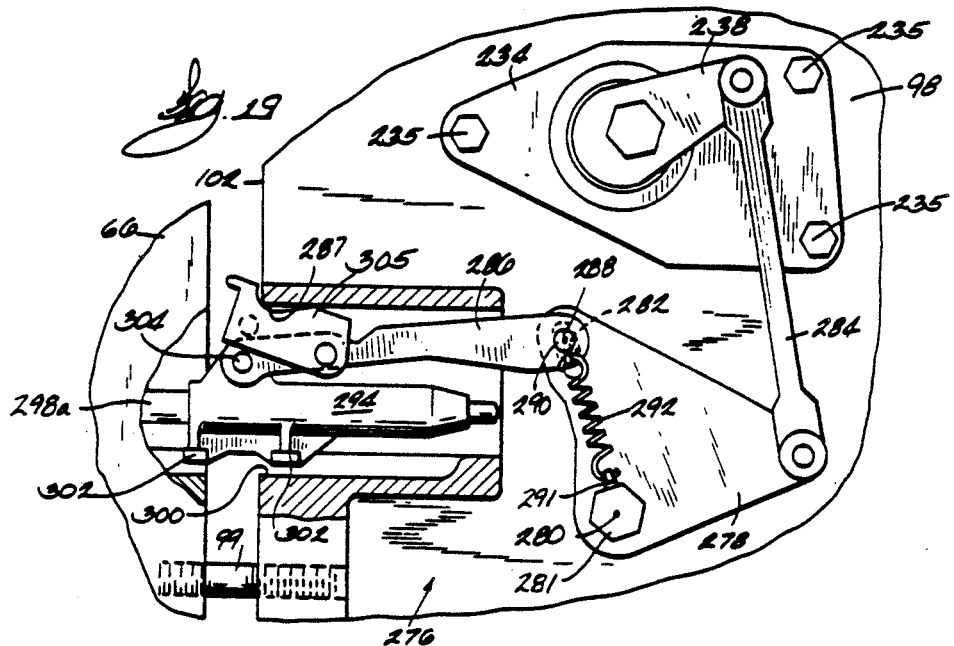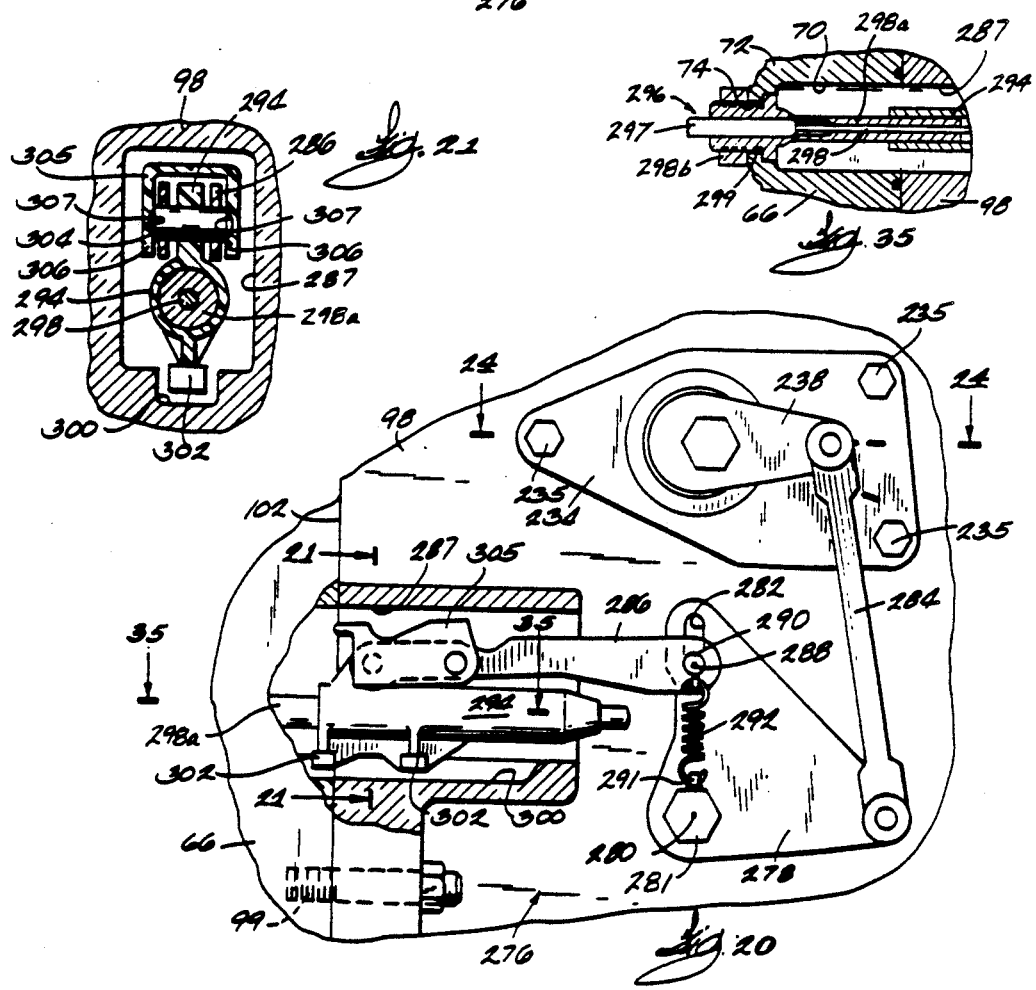

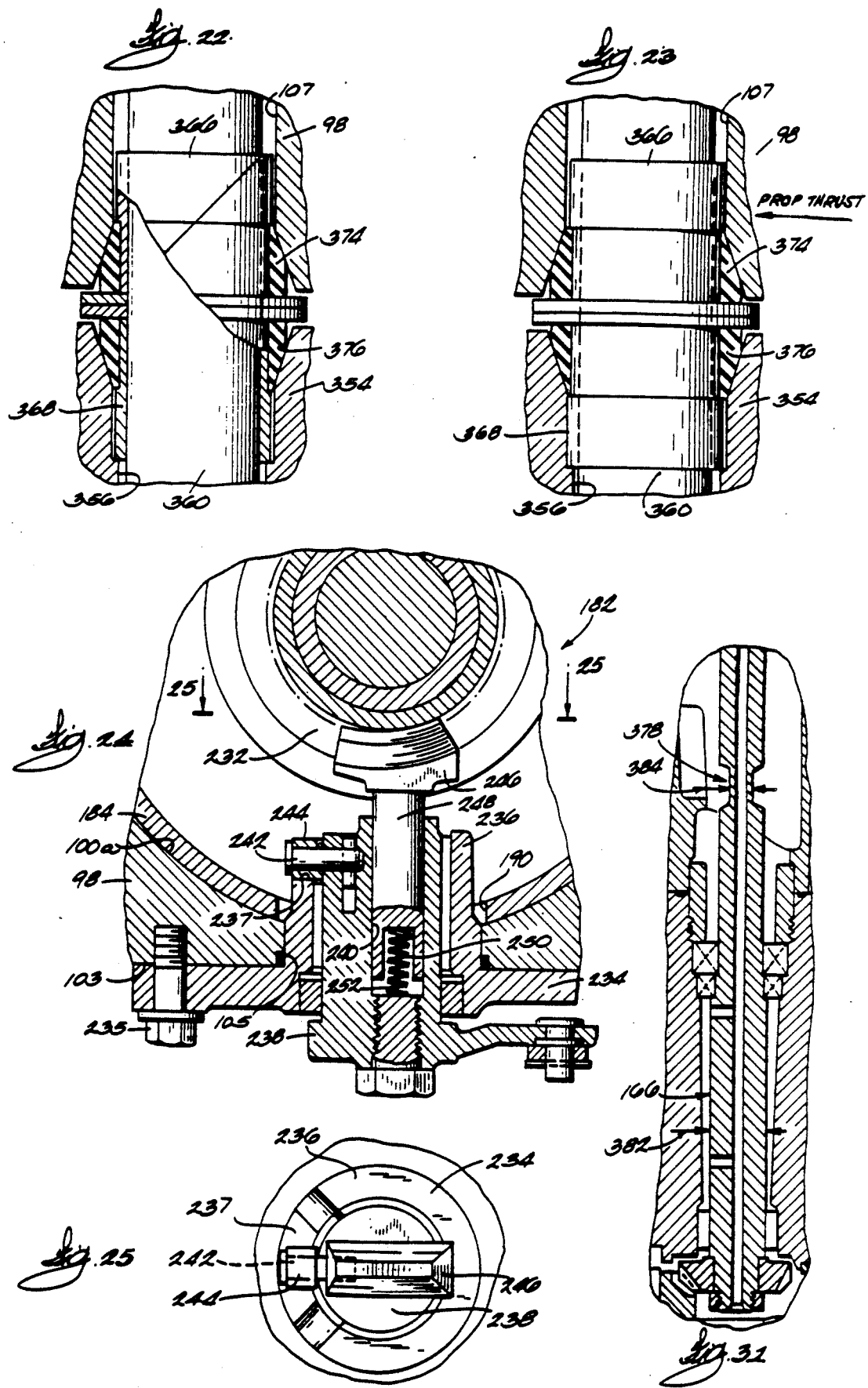

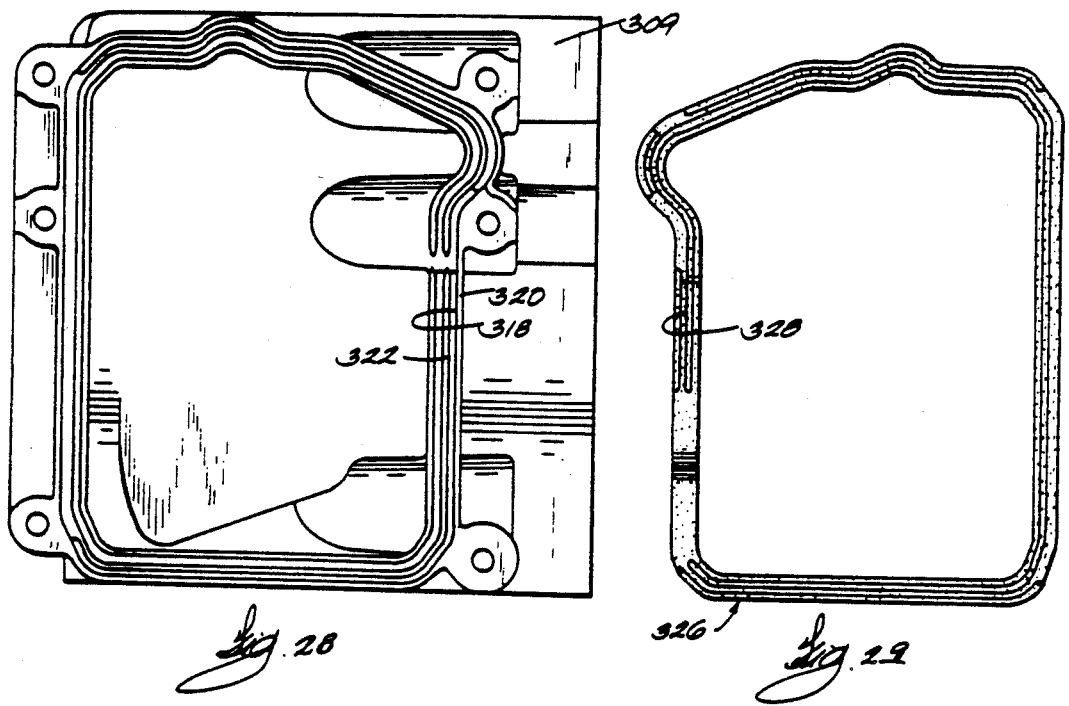
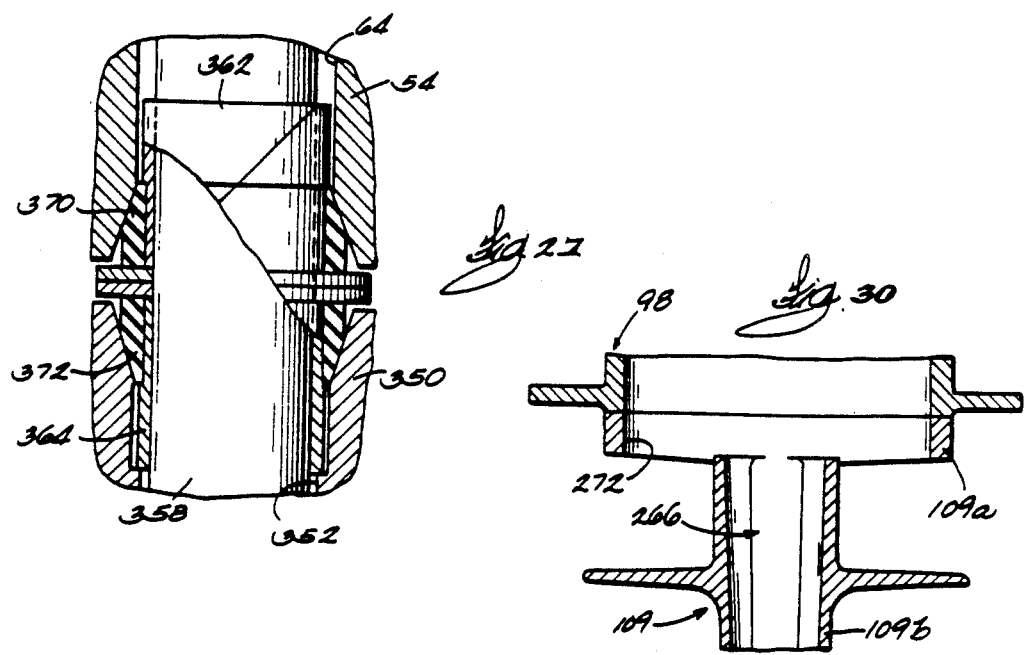

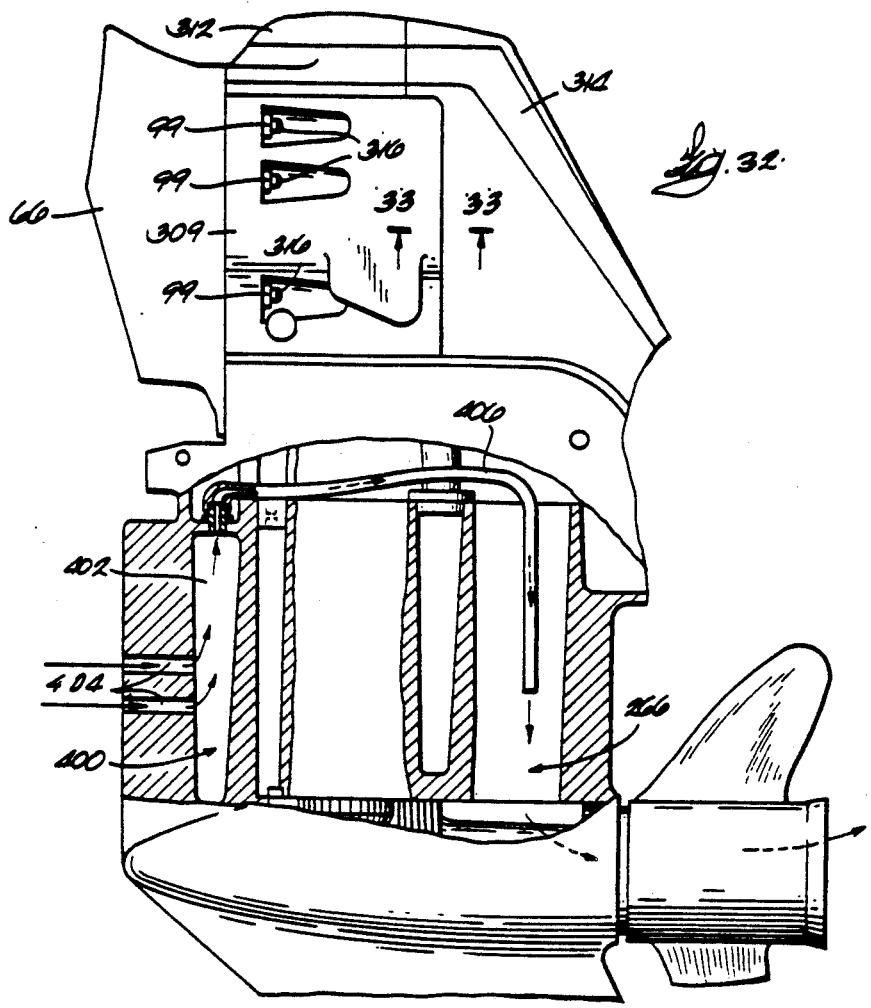
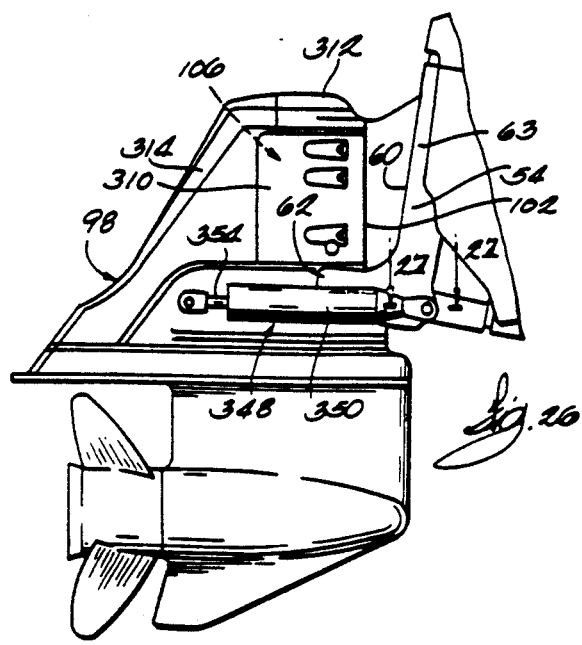

4,993,979

MARINE PROPULSION DEVICE

BACKGROUND OF THE INVENTION

The invention relates to marine propulsion devices, and, more particularly, to stern drive units Still more particularly, the invention relates to lubrication systems for stern drive units.

Attention is directed to the following U.S. Pat. Nos.:

| | |
|---|---|
| 3,006,311 | Oct. 31, 1961 |
| 3,799,291 | Mar. 26, 1974 |
| 3,931,783 | Jan. 13, 1976 |
| 4,650,430 | Mar. 17, 1987 |
| 4,764,135 | Aug. 16, 1988 |

SUMMARY OF THE INVENTION

The invention provides a marine propulsion device comprising a gear housing adapted to be mounted on the transom of a boat, first bearing means supported by the gear housing, a first gear which is rotatably supported by the first bearing means and which is adapted to be driven by an engine, a vertical drive shaft having a lower end, second and third bearing means supported by the gear housing, second and third gears which mesh with and are driven by the first gear and which are respectively supported by the second and third bearing means for rotation relative to the vertical drive shaft, clutch means for causing selective and alternative driving engagement of the second and third gears with the vertical drive shaft, a fourth gear driven by the lower end of the vertical drive shaft, a propeller shaft which has a forward end, which is rotatably supported by the gear housing and which is adapted to have mounted thereon a propeller, a fifth gear which is drivingly mounted on the forward end of the propeller shaft, which meshes with, is driven by and is located forwardly of the fourth gear and which has thereon a centrifugal pump, and means for lubricating at least one of the first, second and third bearing means and including passage means communicating between the centrifugal pump and the one of the first, second and third bearing means.

The invention also provides a marine propulsion device comprising a gear housing adapted to be mounted on the transom of a boat, a horizontal drive shaft having a forward end adapted to be drive by an engine and having a rearward end, first bearing means supported by the gear housing, a first gear which is rotatably supported by the first bearing means and which is driven by the rearward end of the horizontal drive shaft, a vertical drive shaft having a lower end, a clutch housing which is supported by the gear housing and which includes an exterior surface having therein a recess adjacent the first gear, second and third bearing means supported by the clutch housing, second and third gears which mesh with and are driven by the first gear and which are respectively supported by the second and third bearing means for rotation relative to the vertical drive shaft, clutch means for causing selective and alternative driving engagement of the second and third gears with the vertical drive shaft, a fourth gear driven by the lower end of the vertical drive shaft, a propeller shaft which has a forward end, which is rotatably supported by the gear housing and which is adapted to have mounted thereon a propeller, a fifth gear which is drivingly mounted on the forward end of the propeller shaft and which meshes with, is driven by and is located forwardly of the fourth gear, and means for lubricating the first, second and third bearing means and including passage means which communicates with the first, second and third bearing means and which includes the recess.

The invention also provides a marine propulsion device comprising a gear housing adapted to be mounted on the transom of a boat, a horizontal drive shaft having a forward end adapted to be driven by an engine and having a rearward end, first bearing means supported by the gear housing, a first gear which is rotatably supported by the first bearing means and which is driven by the rearward end of the horizontal drive shaft, a vertical drive shaft having a lower end, second and third bearing means supported by the gear housing, second and third gears which mesh with and are driven by the first gear and which are respectively supported by the second and third bearing means for rotation relative to the vertical drive shaft, clutch means for causing selective and alternative driving engagement of the second and third gears with the vertical drive shaft, a fourth gear driven by the lower end of the vertical drive shaft, a propeller shaft which has a forward end, which is rotatably supported by the gear housing and which is adapted to have mounted thereon a propeller, a fifth gear which is drivingly mounted on the forward end of the propeller shaft, which meshes with, is driven by and is located forwardly of the fourth gear and which has thereon a centrifugal pump, fourth bearing means supported by the gear housing, a sixth gear which is rotatably supported by the fourth bearing means and which meshes with and is driven by the second and third gears, and means for lubricating the first, second, third and fourth bearing means and including passage means communicating between the centrifugal pump and the first, second, third and fourth bearing means.

The invention also provides a marine propulsion device comprising a gear housing adapted to be mounted on a transom of a boat, a first gear rotatably supported by the gear housing and adapted to be driven by an engine, a second gear which is rotatably supported by the gear housing, which is driven by the first gear and which is adapted to be drivingly connected to a propeller, a third gear meshing with and driven by the second gear, and means for lubricating the third gear.

In one embodiment, the third gear drives a water pump.

A principal feature of the invention is the provision of the above-described lubrication system for a stern drive unit.

Other features and advantages of the invention will become apparent to those skilled in the art upon review of the following detailed description, claims and drawings.

DESCRIPTION OF THE DRAWINGS

FIG. 1 is a side elevational view, partially in section, of a stern drive unit which embodies the invention and which comprises an upper gearcase, a lower gearcase, a pivot housing, a clutch assembly, a shift linkage, a side cover, a top cover, a rear cover and a seal.

FIG. 2 is an enlarged, partial elevational view, partially in section, of the lower gearcase.

FIG. 3 is a view taken along line 3—3 in FIG. 2.

FIG. 4 is a view taken along line 4—4 in FIG. 3.

FIG. 5 is an enlarged sectional view of the stern drive unit.

FIG. 6 is a view taken along line 6—6 in FIG. 5.

FIG. 7 is an enlarged sectional view, partially broken away, of the stern drive unit.

FIG. 8 is an enlarged sectional view of the stern drive unit.

FIG. 9 is a view taken along line 9—9 in FIG. 8.

FIG. 10 is a view taken along line 10—10 in FIG. 8.

FIG. 11 is an enlarged, partial side elevational view of the stern drive unit in its trimmed-in condition and without hydraulic assemblies.

FIG. 12 is a view similar to FIG. 11 with the stern drive unit in its trimmed-out condition.

FIG. 13 is a front elevational view of the clutch assembly.

FIG. 14 is a rear elevational view of the clutch assembly.

FIG. 15 is an enlarged, partial side elevational view of the upper gearcase.

FIG. 16 is a view taken along line 16—16 of FIG. 15.

FIG. 17 is a view taken along line 17—17 in FIG. 15.

FIG. 18 is a view taken along line 18—18 in FIG. 15.

FIG. 19 is a side elevational view of the shift linkage before the pivot housing is connected to the gear housing.

FIG. 20 is a side elevational view of the shift linkage after the pivot housing is connected to the gear housing.

FIG. 21 is a view taken along line 21—21 in FIG. 20.

FIG. 22 is a view taken along line 22—22 in FIG. 1.

FIG. 23 is a view similar to FIG. 22 with the stern drive unit under forward thrust conditions.

FIG. 24 is a view taken along line 24—24 in FIG. 20.

FIG. 25 is a view taken along line 25—25 in FIG. 24.

FIG. 26 is an elevational view showing the side opposite the side shown in FIG. 1.

FIG. 27 is a view taken along line 27—27 in FIG. 26.

FIG. 28 is an elevational view of the inside of the side cover.

FIG. 29 is an elevational view of the seal.

FIG. 30 is a view taken along line 30—30 in FIGS. 1 and 5.

FIG. 31 is a partial side elevational view of a first alternative embodiment of the invention.

FIG. 32 is a side elevational view of a second alternative embodiment of the invention.

FIG. 35 is a view taken along line 35—35 in FIG. 20.

Figure 34:
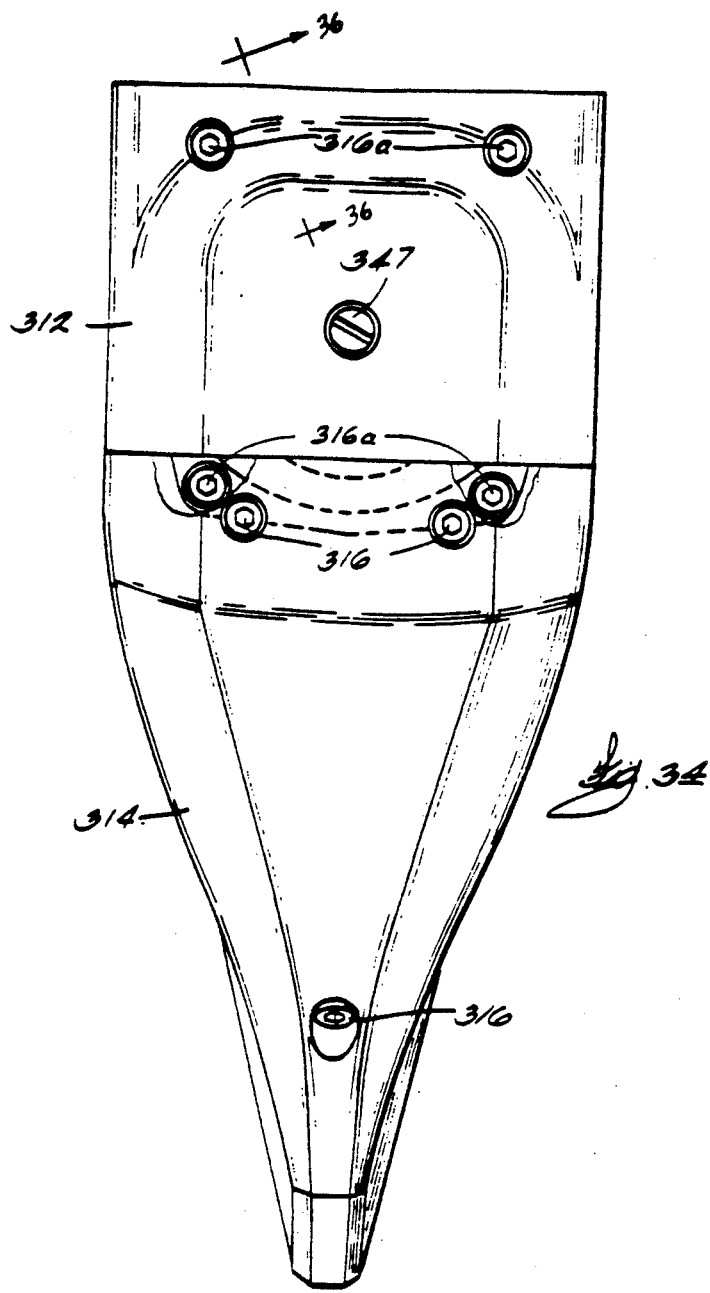
FIG. 34 is a top plan view of the top and rear covers.
Figure 33:
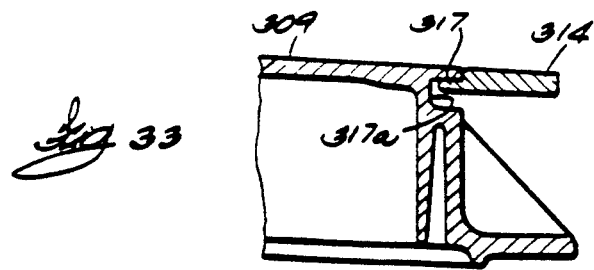
FIG. 33 is a view taken along line 33—33 in FIG. 32.

Before one embodiment of the invention is explained in detail, it is to be understood that the invention is not limited in its application to the details of construction and the arrangements of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

DESCRIPTION OF THE PREFERRED EMBODIMENT

A marine propulsion device or stern drive unit 10 embodying the invention is illustrated in the drawings. While the illustrated marine propulsion device is a stern drive unit, it should be understood that many of the features of the invention are applicable to other types of marine propulsion devices, such as outboard motors.

The stern drive unit 10 comprises (see FIG. 1) an internal combustion engine 12 mounted inside a boat 14. The engine 12 includes a cooling water jacket (not shown), and opposite cylinder banks 18 (only one is shown) having respective exhaust outlets.

The stern drive unit 10 also comprises a transom bracket 20 mounted on the inside of the transom 22 of the boat 14, and an exhaust pipe 24 (FIGS. 1 and 8) extending through the transom bracket 20. While various suitable exhaust pipes can be employed, in the preferred embodiment, the exhaust pipe 24 is Y-shaped and includes (see FIG. 8) a central portion 26 having therein a rearwardly opening outlet 28, and first and second forward portions 30 (FIG. 1) and 32 (FIG. 8) communicating with the engine 12 and converging into the central portion 26. More particularly, the first forward portion 30 communicates with the exhaust outlet of one of the cylinder banks 18, and the second forward portion 32 communicates with the exhaust outlet of the other of the cylinder banks 18. As is known in the art, the forward portions 30 and 32 also communicate with the engine water jacket so that both exhaust gas and cooling water flow through the exhaust pipe 24. Cooling water flowing into the central portion 26 of the exhaust pipe 24 tends to collect at the bottom of the central portion 26.

The stern drive unit 10 also comprises (see FIGS. 1, 8 and 9) a gimbal housing 34 mounted on the outside of the transom 22. The gimbal housing 34 has therein an exhaust-water passage 36 including (see FIG. 8) a forwardly opening inlet 38 communicating with the outlet 28 of the exhaust pipe 24, and a rearwardly opening exhaust outlet 40. The exhaust-water passage 36 also includes (see FIGS. 8 and 9) an exhaust conducting portion 42 having a generally circular cross-section and having a central lower portion 44 (FIG. 9). The exhaust-water passage 36 also includes a water conducting portion or trough 46 extending downwardly from the central lower portion 44 of the exhaust conducting portion 42, extending rearwardly from the inlet 38, and having a rearward end defined by a water dam 48. The exhaust-water passage 36 also includes a downwardly opening water outlet 50 communicating with the water conducting portion 46.

The stern drive unit 10 also comprises (see FIG. 8) a sacrificial anode 52 fixed to the gimbal housing 34 and located beneath and adjacent the water outlet 50.

The stern drive unit 10 also comprises (see FIGS. 1, 11, 12 and 26) a gimbal ring 54 mounted on the gimbal housing 34 for pivotal movement relative thereto about a generally vertical steering axis 56. Except as described hereinafter, the gimbal ring 54 is conventional. The gimbal ring 54 includes a first side portion 58 having (see FIG. 11) a first rearward surface 60 and a first lateral support portion 62 extending rearwardly from the first rearward surface 60. The gimbal ring 54 also includes (see FIG. 26) a second side portion 63 which is a mirror image of the first side portion 58, which is spaced laterally from the first side portion 58 and which has a second rearward surface 60 and a second lateral support portion 62 extending rearwardly from the second rearward surface 60. The lateral support portions 62 are located beneath the below-described tilt axis, as shown in FIGS. 11 and 12, and extend a certain distance rearwardly of the rearward surface 60. The gimbal ring 54 has therethrough a transverse bore 64 (FIG. 27), the reason for which is explained hereinafter.

The stern drive unit 10 also comprises (see FIGS. 1, 11 and 12) a pivot housing 66 mounted on the gimbal ring 54 for pivotal movement relative thereto about a generally horizontal tilt axis 68. The pivot housing 66 has a rearward surface 68 having therein (see FIG. 35) a recess 70. The recess 70 is defined in part by a wall 72 having therein an opening 74, the reason for which is explained hereinafter. The pivot housing 66 also has therein (see FIGS. 5, 8 and 10) an exhaust passage 78 including a forwardly opening inlet 80 having generally parallel upper and lower portions 82 and 84, respectively, and (see FIG. 10) forwardly diverging, opposed side portions 86 and 88. The exhaust passage 78 also includes a rearwardly opening outlet 90 (FIG. 5).

The stern drive unit 10 also comprises (see FIGS. 8 and 10) a flexible conduit 92 extending rearwardly from the outlet 40 of the gimbal housing exhaust-water passage 36. The conduit 92 can be secured to the gimbal housing 34 by any suitable means, such as a retaining band 93. The conduit 92 has a rearwardly opening outlet 94 extending within the inlet 80 of the pivot housing exhaust passage 78. The construction of the pivot housing inlet 80 permits the pivot housing 66 to pivot about the steering axis 56 and throughout the trim range of the stern drive unit 10 while maintaining location of the conduit outlet 94 within the pivot housing inlet 80. The space between the conduit 92 and the pivot housing 66 affords exhaust gas relief.

The stern drive unit 10 also comprises (see FIGS. 1 and 5) a gear housing 96 fixedly connected to the rearward end of the pivot housing 66 for common movement therewith. While the gear housing 96 can have various suitable constructions, in the preferred embodiment, the gear housing 96 includes an upper gearcase or upper gear housing 98 fixedly connected to the pivot housing 66 by mounting studs 99 (FIGS. 19 and 20). The upper gearcase 98 includes a horizontally extending upper surface or portion 100 having therein a vertically extending cylindrical recess 100a, and a vertically extending rear surface or portion 101 having therein a horizontally extending cylindrical bore or opening 101a communicating with the recess 100a. The upper gearcase 98 also includes a vertically extending front surface or portion 102 having therein a horizontally extending cylindrical bore or opening 102a communicating with the recess 100a. The gearcase 98 also includes a vertically extending side portion 103 having (see FIG. 11) a first forward surface, which is part of the surface 102, and a first lateral support portion 104 extending forwardly from the forward surface 102 and laterally adjacent or in overlapping relation to the first gimbal ring lateral support portion 62. The side portion 103 also has therein (see FIG. 24) a horizontally extending cylindrical opening or bore 105 communicating with the recess 100a.

The upper gearcase 98 also includes (see FIG. 26) an opposite side portion 106 spaced laterally from the side portion 103. The side portion 106 has a forward surface, which is part of the surface 102, and a lateral support portion (substantially identical to the portion 104 shown in FIG. 11) extending forwardly from the forward surface 102 and laterally adjacent or in overlapping relation to the second gimbal ring lateral support portion 62.

The upper gearcase 98 also has therethrough a bore 107 (FIG. 22) extending between the side surfaces 103 and 106. Each of the gear housing lateral support portions 104 has mounted thereon (see FIG. 12) a wear pad 108 made of a low friction material. The wear pads 108 facilitate sliding movement of the gear housing lateral support portions 104 relative to the adjacent gimbal ring lateral support portions 62.

Each of the gear housing lateral support portions 104 extends a distance substantially equal to the above-mentioned certain distance (the distance the gimbal ring lateral support portions 62 extend rearwardly of the rearward surface 60) forwardly of the forward surface 102 of the upper gearcase 98. The gear housing lateral support portions 104 have maximum overlap with the gimbal ring lateral support portions 62 when the stern drive unit 10 is in its trimmed-in condition, as shown in FIG. 11. The gear housing lateral support portions 104 have minimum overlap with the gimbal ring lateral support portions 62 when the stern drive unit 10 is in its trimmed-out condition, as shown in FIG. 12. The stern drive unit 10 is also operable through a trim range in which the lateral support portions 104 and 62 do not overlap.

The gear housing 96 also includes (see FIGS. 1-5) a lower gearcase or lower gear housing 109 fixedly connected to the upper gearcase 98. The lower gearcase 109 includes a hollow lower portion 110, the reason for which is explained hereinafter. The lower gearcase also includes a generally vertical wall 110a, the reason for which is also explained hereinafter. The upper and lower gearcases 98 and 109 are preferably made of aluminum. The gear housing 96, the pivot housing 66, the gimbal ring 54 and the gimbal housing 34 constitute a propulsion unit.

The stern drive unit 10 also comprises (see FIGS. 2-5) a propeller shaft bearing housing 112 supported by the hollow portion 110 of the lower gearcase 109 so that the hollow portion 110 of the lower gearcase 109 surrounds the propeller shaft bearing housing 112. In the preferred embodiment, the bearing housing 112 threadedly engages the lower gearcase 109 and is rotatable relative to the lower gearcase 109 in a direction (clockwise in FIG. 3) causing disengagement of the bearing housing 112 and the lower gearcase 109. The bearing housing 112 includes a longitudinal axis 114, and an exterior surface 116 having therein an annular groove or recess 118. The bearing housing 112 also includes (see FIG. 4) an annular inclined surface 120 partially defining the groove 118. The bearing housing 112 further includes an annular, rearwardly facing surface 119.

The stern drive unit 10 also comprises means for retaining the bearing housing 112 within the lower gearcase 109. Preferably, this means includes (see FIGS. 3 and 4) a retaining member 122 which is supported by the lower gearcase 109 and which extends into the groove 118. Preferably, the retaining member 122 is a screw threaded into the lower gearcase 109, and the retaining member 122 includes (see FIG. 4) a pointed portion 124 engaging the inclined surface 120 of the bearing housing 112. Furthermore, in the preferred embodiment, the retaining member 122 extends along an axis 126 (FIG. 3) in spaced and transverse relation to the bearing housing axis 114, and, as shown in FIG. 3, the retaining member 122 opposes rotation of the bearing housing 112 relative to the lower gearcase 109 in the direction causing disengagement of the bearing housing 112 and the lower gearcase 109. The means for retaining the bearing housing 112 also includes a retaining member 127 which engages the bearing housing surface 119 and which is fixed to the lower gearcase by a bolt 127a.

The stern drive unit 10 also comprises (see FIGS. 5 and 6) an elongated sacrificial anode 128 located interiorly of the hollow lower portion 110 of the lower gearcase 109. More particularly, the anode 128 is located between the hollow lower portion 110 and the bearing housing 112. The stern drive unit 10 further comprises means for securing the anode 128 to the propeller shaft bearing housing 112 and for affording removal of the anode 128 from the bearing housing 112 without removing the bearing housing 112 from the lower gearcase 109. While various suitable securing means can be used, in the illustrated construction, such means includes an arcuate mounting bracket 130, and means for securing the mounting bracket 130 to the bearing housing 112. Preferably, the means for securing the bracket 130 to the bearing housing 112 includes bolts or screws 132. The means for securing the anode 128 to the bearing housing 112 also includes means for securing the anode 128 to the mounting bracket 130. Preferably, this means includes an elongated member or bolt 134 which extends through the mounting bracket 130 and through the anode 128 and which is threaded into the bearing housing 112. The anode 128 is removed from the lower gearcase 109 simply by removing the bolts 132 and the bolt 134.

The stern drive unit 10 also comprises (see FIGS. 2 and 5) bearing means 136 supported by the propeller shaft bearing housing 112, and a propeller shaft 138 supported by the bearing means 136 for rotation about the axis 114. The stern drive unit 10 also comprises (see FIGS. 1 and 5) a propeller 140 mounted on the rearward end of the propeller shaft 138 for rotation therewith and driven by a drive train which is disclosed hereinafter. The propeller 140 includes (see FIG. 5) a propeller hub 142 having therein an exhaust passageway 144.

The stern drive unit 10 also comprises (see FIG. 5) a bevel gear 146 mounted on the forward end of the propeller shaft 138 for common rotation therewith. In the preferred embodiment, the bevel gear 146 has thereon a centrifugal pump 148, the reason for which is explained hereinafter. The stern drive unit 10 also comprises bearing means 150 which is supported by the lower gearcase 109 and which rotatably supports the bevel gear 146 and thereby the forward end of the propeller shaft 138.

The stern drive unit 10 also comprises (see FIGS. 1, 5 and 7) a first or forward horizontal drive shaft 152 having forward and rearward ends and including a universal joint (not shown) intermediate the ends, as is known in the art. The forward end of the drive shaft 152 is driven by the engine 12.

The stern drive unit 10 also comprises (see FIGS. 5 and 7) a forward bearing housing 156 which is supported by the upper gear housing 98 and which extends partially within the opening 102a. In the preferred embodiment, the forward bearing housing 156 is mounted on the front surface 102 of the upper gearcase 98 by suitable means such as bolts (not shown). The bearing housing 156 has an exterior surface including a flat portion 160 (FIG. 7), the reason for which is explained hereinafter.

The stern drive unit 10 also comprises bearing means 162 supported by the bearing housing 156, and a bevel gear 164 which is rotatably supported by the bearing means 162 and which is mounted on the rearward end of the horizontal drive shaft 152 for common rotation therewith. The assembly of the bearing housing 156, the bearing means 162 and the bevel gear 164, along with any necessary gear position shims (not shown), is securable to and removable from the upper gearcase 98 as a unit.

The stern drive unit 10 also comprises (see FIG. 5) a vertical drive shaft 166. While the vertical drive shaft 166 can have various suitable constructions, in the preferred embodiment, the vertical drive shaft 166 includes a lower portion 168 rotatably supported within the lower gearcase 109 by upper and lower bearing means 170 and 172, respectively. The lower end of the lower portion 168 has thereon a bevel gear 173 meshing with and driving the gear 146. The drive shaft 166 also includes an upper sleeve portion 174 splined to the upper end of the lower portion 168.

The stern drive unit 10 also comprises (see FIGS. 5, 7, 13 and 14) a cone clutch assembly 182 connected between the bevel gear 164 and the vertical drive shaft 166. To the extent not described hereinafter, the clutch assembly 182 is substantially identical to the clutch described in U.S. Pat. No. 3,269,497, which is incorporated herein by reference.

The clutch assembly 182 includes (see FIGS. 13 and 14) a generally cylindrical clutch housing 184 removably supported within the recess 100a of the upper gearcase 98. The manner in which the clutch housing 184 is inserted into, retained in, and removed from the gearcase 98 is described hereinafter. The housing 184 has open upper and lower ends and has therein a first or forward opening 186 (FIG. 13) through which the bevel gear 164 extends, a second or rearward opening 188 (FIG. 14) and a third or side opening 190 (FIG. 24). The clutch housing 184 also has an exterior surface 192 including a flat portion 194 (FIG. 7) engaging the flat portion 160 of the bearing housing 156. The exterior surface 192 has therein (see FIG. 13) a recess 196 located adjacent the bevel gear 164 and the forward opening 186 and communicating with the forward opening 186, a recess 197 located above the forward opening 186, and (see FIG. 14) a recess 198 located adjacent and communicating with the rearward opening 188. The reason for the recesses 196 and 198 is explained hereinafter.

The clutch assembly 182 also includes a generally vertical drive shaft 200 which is rotatably supported within the clutch housing 184, which includes (see FIG. 7) a helically threaded portion 201 and which extends outwardly of the lower end of the clutch housing 184 and is drivingly connected to the sleeve portion 174 of the vertical drive shaft 166. The manner in which the clutch assembly drive shaft 200 is rotatably supported is described hereinafter. The drive shaft 200 has therein (see FIG. 7) an axial passage 202 and radial passages 203 communicating with the axial passage 202. It should be noted that the clutch assembly drive shaft 200 can be considered to be part of the vertical drive shaft 166.

The clutch assembly 182 also includes (see FIGS. 5 and 7) opposed upper and lower bevel gears 204 and 206, respectively, coaxially supported within the clutch housing 184 for rotation relative to the shaft 200. The upper and lower bevel qears 204 and 206 both mesh with and are driven by the bevel gear 164. In the preferred embodiment, as shown in FIGS. 5 and 7, the shaft 200 is supported for rotation relative to the upper bevel gear 204 by suitable bearing means 208 and the gear 204 is supported for rotation relative to the clutch housing 184 by suitable bearing means 210. The shaft 200 is supported for rotation relative to the lower gear 206 by suitable bearing means 212 and the gear 206 is supported for rotation relative to the clutch housing 184 by suitable bearing means 214. Thus, the shaft 200 is rotatably supported within the clutch housing 184 by the bearing means 208, 210, 212 and 214 and by the upper and lower bevel gears 204 and 206. In the illustrated construction, the bearing means 210 and 214 are ball bearing assemblies and the bearing means 208 and 212 are needle bearing assemblies.

The clutch assembly 182 also includes (see FIG. 7) clutch means 216 located between the bevel gears 204 and 206 for causing selective and alternative engagement of the bevel gears 204 and 206 with the shaft 200. In the illustrated construction, the clutch means 216 includes opposed upper and lower clutch elements 218 and 220, respectively. The upper element 218 is splined or otherwise connected at 221 to the upper bevel gear 204 for common rotation therewith and has therein a frustoconical recess 222, and the lower element 220 is splined or otherwise connected at 223 to the lower bevel gear 206 for common rotation therewith and has therein a frustoconical recess 224. Thus, the clutch elements 218 and 220 are supported in coaxial relation. The clutch means 216 also includes a clutch member 226 threaded onto the threaded portion 201 of the shaft 200 for axial movement relative thereto and between the clutch elements 218 and 220. The clutch member 226 includes an upper frustoconical portion 228 adapted to extend into the recess 222 of the upper clutch element 218 and to frictionally engage the upper clutch element 218, and the clutch member 226 also includes a lower frustoconical portion 230 adapted to extend into the lower clutch element recess 224 and to frictionally engage the lower clutch element 220. The clutch member 226 also has therein a circumferentially extending, V-shaped groove 232.

The clutch assembly 182 also includes (see FIGS. 24 and 25) a control housing 234 which is secured to the side surface 103 of upper gearcase 98 by bolts 235, which includes a portion 236 extending through the side opening 105 in the upper gearcase 98 and through the side opening 190 in the clutch housing 184 and which has thereon a cam surface 237. The clutch assembly 182 also includes a control shaft 238 supported by the control housing 234 for pivotal movement relative thereto between a forward position (not shown), a neutral position (FIG. 20) and a reverse position (FIG. 19). The shaft 238 has therein an axially extending bore 240 and has thereon a radially extending pin 242. The control shaft 238 constitutes an actuating member having a portion extending exteriorly of the upper gear housing 98. The clutch assembly 182 further includes a roller 244 which is rotatably mounted on the pin 242 and which engages the cam surface 237 of the control housing 234.

The clutch assembly 182 also includes (see FIGS. 24 and 25) a wedge-shaped member 246 located in the clutch member groove 232 and eccentrically mounted on the control shaft 238. More particularly, the wedge-shaped member 246 includes a generally cylindrical portion 248 which is slideably received in the control shaft bore 240 and which has therein an axial bore 250. The control shaft 238 and the wedge-shaped member 246 constitute means extending through the side opening 190 of the clutch housing 184 for actuating the clutch means 216.

Because the wedge-shaped member 246 is eccentrically mounted on the control shaft 238, movement of the control shaft 238 in the direction from its forward position to its reverse position causes upward movement of the wedge-shaped member 246, and movement of the control shaft 238 in the direction from its reverse position to its forward position causes downward movement of the wedge-shaped member 246. Such movement of the wedge-shaped member 246 in turn causes movement of the clutch member 226.

The clutch assembly 182 also includes means including the roller 244 and the cam surface 237 for moving the control shaft 238 axially. As is known in the art, the cam surface 237 is configured so that movement of the control shaft 238 from its neutral position to either of its forward and reverse positions causes axial movement of the control shaft 238 away from the clutch member 226, and so that movement of the control shaft 238 from either of its forward and reverse positions to its neutral position causes axial movement of the control shaft 238 toward the clutch member 226.

The clutch assembly 182 further includes (see FIG. 24) means for biasing the wedge-shaped member 246 toward the clutch member 226. While various suitable biasing means can be employed, in the preferred embodiment, such means includes a spring 252 which is located in the control shaft bore 240 and in the wedge-shaped member bore 250 and which extends between the control shaft 238 and the wedge-shaped member 246.

The clutch assembly 182 is removably supported within the gear housing 98, and the entire clutch assembly 182, including the clutch housing 184, the upper and lower bevel gears 204 and 206, the bearing means 208, 210, 212 and 214, any necessary gear position shims (not shown) and the clutch means 216, is insertable into and removable from the gear housing 98 as a unit. Thus, the stern drive unit 10 comprises means for affording insertion of the clutch assembly 182 as a unit into the upper gear housing 98 and for affording removal of the clutch assembly 182 as a unit from the gear housing 98.

The stern drive unit 10 also comprises (see FIGS. 5 and 7) a rear bearing housing 254 which is mounted on the rear surface 101 of the upper gearcase 98 by suitable means such as bolts (not shown) and which extends partially through the opening 101a in the rear surface 101, and a water pump 256 mounted on the rear bearing housing 254. Suitable conduit means (not shown) provide fluid communication between the outlet of the water pump 256 and the engine water jacket, and suitable conduit means 258 provide fluid communication between the inlet of the pump 256 and the body of water in which the stern drive unit 10 is operating.

The stern drive unit 10 also comprises (see FIGS. 5 and 7) a second or rearward horizontal drive shaft 260 having a forward end and an aft end. The second horizontal drive shaft 260 is rotatably supported in coaxial and axially spaced relation to the forward horizontal drive shaft 152, and the aft end of the shaft 260 is drivingly connected to the pump 256.

The stern drive unit 10 further comprises a rear bevel gear 264 which is mounted on the forward end of the shaft 260 and which meshes with and is driven by both of the upper and lower bevel gears 204 and 206.

The stern drive unit 10 also comprises (see FIGS. 5 and 7) bearing means 265 which is supported by the rear bearing housing 254 and which rotatably and axially supports the gear 264. Preferably, the bearing means 265 includes a needle bearing assembly 265a rotatably supporting the gear 264, and a thrust washer 265b and a roller bearing 265c axially supporting the gear 264.

The forward bearing housing 156, the clutch assembly 182 and the rear bearing housing 254 are assembled in the upper gearcase 98 as follows. First, the clutch housing 184 is dropped into the recess 100a with the forward opening 186 in the clutch housing 184 aligned with the forward opening 102a in the upper gearcase 98 (this also aligns the rearward opening 188 in the clutch housing 184 with the opening 101a in the upper gearcase 98 and the side opening 190 in the clutch housing 184 with the side opening 106 in the upper gearcase 98). Next, the forward bearing housing 156, the rear bearing housing 254 and the control housing 234 are secured to the upper gearcase 98 (these can be assembled in any order). The forward bearing housing 156 is mounted on the upper gearcase 98 so that the bevel gear 164 extends through the opening 102a in the upper gearcase 98 and through the forward opening 186 in the clutch housing 184 and meshes with the upper and lower bevel gears 204 and 206. When the forward bearing housing 156 is secured to the upper gearcase 98 and the clutch housing 184 is properly oriented within the upper gearcase 98, the flat portion 160 of the bearing housing 156 engages the flat portion 194 of the clutch housing 184 and, as described above, prevents rotation of the clutch housing 184 relative to the upper gearcase 98. The rear bearing housing 254 is mounted on the rear surface 101 of the upper gearcase 98 so that the rear bevel gear 264 extends through the opening 101a in the upper gearcase 98 and through the rearward opening 188 in the clutch housing 184 and meshes with the upper and lower bevel gears 204 and 206. The control housing 234 is secured to the side surface 105 of the upper gearcase 98 so that the control shaft 238 and the wedge-shaped member 246 extend through the side opening 106 in the upper gearcase 98 and through the side opening 190 in the clutch housing 184 and so that the wedge-shaped member 246 extends into the clutch member groove 232.

The forward bearing housing 156, the clutch assembly 182 and the rear bearing housing 254 are removed from the upper gearcase 98 (in any order) before the clutch housing 184 is removed from the recess 100a in the upper gearcase 98.

In alternative embodiments (not shown), the water pump 256 can be driven by arrangements other than the gear 264 and the shaft 260. For example, the shaft 260 need not be supported in coaxial relation to the shaft 152, and the gear 264 need not mesh with both of the upper and lower gears 204 and 206. Also, the gear 264 need not be a bevel gear, but could be a hypoid gear or a worm gear.

The stern drive unit 10 also comprises (see FIG. 5), in the gear housing 96, an exhaust passageway 266 defined in part by the wall 110a of the lower gearcase 109. The exhaust passageway 266 has an upstream end 268 communicating with the pivot housing exhaust passage 78, and a downstream end or downstream exhaust outlet 270 communicating with the propeller hub exhaust passage 144. The exhaust passageway 266 also has an upstream exhaust outlet 272 (FIG. 30) located intermediate the upstream end 268 and the downstream exhaust outlet 270. More particularly, as shown in FIG. 30, the lower gearcase 109 includes an upper portion 109a mating with the lower end of the upper gearcase 98, and a lower portion 109b extending downwardly from the upper portion 109a and having a width substantially less than the width of the upper portion 109a, so that portions of the upper portion 109a extend laterally from and outwardly of the lower portion 109b. The upstream exhaust outlet 272 is located in the laterally extending portions of the upper portion 109a. Thus, the upstream exhaust outlet 272 is located on either side of the lower portion 109b of the lower gearcase 109.

The stern drive unit 10 also comprises (see FIG. 5) means for cooling the propeller hub 142. Preferably, this means includes means for introducing cooling water into the exhaust passageway 266 at a location 273 downstream of the upstream exhaust outlet 272. More particularly, in the preferred embodiment, the location 273 is intermediate the upstream exhaust outlet 272 and the downstream exhaust outlet 270, and thereby is also upstream and adjacent the propeller hub exhaust passageway 144. While various suitable means can be employed, in the preferred embodiment, such means includes the pump 256, and a conduit 274 communicating between the outlet of the pump 256 and the exhaust passageway 266.

The stern drive unit 10 also comprises (see FIGS. 19-21) a shift linkage 276 for actuating the clutch assembly 182. The shift linkage 276 includes a lever or member 278 mounted on the gear housing 98 for pivotal movement relative thereto about a first axis 280 defined by a bolt or screw 281. Preferably, the lever 278 has therein a slot 282. The linkage 276 also includes means for actuating the clutch means 216 in response to pivotal movement of the lever 278 While various suitable actuating means can be used, in the illustrated construction, such means includes a link 284 extending between the lever 278 and the control shaft 238. As shown in FIGS. 19 and 20, the link 284 has a lower end pivotally connected to the lever 278 and an upper end pivotally connected to the control shaft 238.

The shift linkage 276 also includes a link 286 which extends through a passageway 287 extending rearwardly from the forward surface 102 of the gear housing 98. As shown in FIG. 35, the passageway 287 communicates with the recess 70 in the pivot housing 66 when the upper gearcase 98 is connected to the pivot housing 66. The shift linkage 276 also includes (see FIGS. 19 and 20) means for actuating the clutch means 216 in response to movement of the link 286. This means preferably includes means for moving the lever 278 in response to movement of the link 286, and the means for moving the lever 278 preferably includes means connecting the link 286 to the lever 278 for pivotal movement relative thereto about an axis 288 spaced from the first axis 280. While various suitable connecting means can be employed, in the preferred embodiment, the means connecting the link 286 to the lever 278 includes a pin 290 slideably located in the slot 282, and means for biasing the pin 290 toward the first axis 280. Preferably, the means for biasing the pin 290 includes a retaining member 291 secured between the lever 278 and the head of the bolt 281. The means for biasing the pin 290 also includes a spring 292 extending between the retaining member 291 and the pin 290. The retaining member 291 is keyed to the lever 278 so that the member 291 pivots with the lever 278, and so that the spring 292 always extends along the line on which the slot 282 is located.

The shift linkage 276 also includes a guide member 294 which extends rearwardly from the pivot housing recess 70 and into the passageway 287 and which is connected to the rearward end of a control cable 296. The control cable 296 includes an outer sheath 297

(FIG. 35) fixed relative to the pivot housing 66 (and therefore fixed relative to the gear housing 98 when the pivot housing 66 is connected to the gear housing 98), and an inner core 298 which is slidable relative to the outer sheath and which is fixed to the guide member 294. In the preferred embodiment, as shown in FIG. 35, a cable guide 298a extends into the recess 70 via the opening 74, is fixed to the pivot housing 66 by a nut 298b threaded onto the end of the cable guide 298a, and is sealed relative to the pivot housing 66 by a sealing member 299 located in the opening 74. The cable sheath 297 is crimped within the cable guide 298a and is thereby fixed relative to the pivot housing 66, and the cable core 298 extends outwardly of the cable guide 298a and is fixed to the guide member 294.

The linkage 276 also includes means for guiding movement of the guide member 294 relative to the gear housing 98. While various suitable guiding means can be used, in the illustrated construction, such means includes a slot 300 in the gear housing 98 and a projection or projections 302 extending from the guide member 294 and extending into the slot 300.

The shift linkage 276 also includes manually engageable and disengageable means engageable only when the gear housing 98 and the pivot housing 66 are in partially assembled spaced relation (as described below) for connecting the guide member 294 to the link 286. While various suitable means can be used, in the illustrated construction, such means includes a pin 304 extending through the guide member 294 and through the link 286, and means for securing the pin 304 relative to the guide member 294 and to the link 286. Preferably, the means for securing the pin 304 includes a clip 305 pivotally mounted on the link 286. The clip 305 is movable between a first position (FIG. 19) permitting removal of the pin 304 from the guide member 294 and from the link 286 and a second position (FIGS. 20 and 21) securing the pin 304 relative to the guide member 294 and to the link 286. More particularly, the clip 305 includes (see FIG. 21) spaced portions 306 having therein respective depressions 307 which receive the opposite ends of the pin 304 when the clip 305 is in its second position.

As shown in the FIG. 19, the link 286 extends forwardly from the gear housing 98 when the control shaft 238 is in its reverse position (for a standard rotation propeller), so that the guide member 294 can be connected to the link 286 before the pivot housing 66 is connected to the gear housing 98. As also shown in FIG. 19, the pivot housing 66 and gearcase 98 are vertically aligned, spaced, and partially assembled by the mounting studs 99 before the guide member 294 is connected to the link 286. This prevents the guide member 294 and the link 286 from bearing any of the weight of the pivot housing 66 or the gearcase 98. After the guide member 294 is fully secured to the link 286, movement of the pivot housing 66 toward the gear housing 98 to connect or fully assemble the gear housing 98 and the pivot housing 66 causes rearward movement of the link 286 and thereby rotates the control shaft 238 from its reverse position to its neutral position. Also, connection of the gear housing 98 and the pivot housing 66 prevents access to the above-described means for connecting the guide member 294 to the link 286. Thus, this means is engageable only when the gear housing 98 and pivot housing 66 are in partially assembled spaced relation.

The shift linkage 276 also includes means for permitting overtravel of the link 286 relative to the lever 278. In the preferred embodiment, this means and the means connecting the link 286 to the lever 278 include lost motion means connecting the link 286 to the lever 278. Preferably, the lost motion means includes the slot 282, the pin 290 and the spring 292. During initial movement of the lever 278 from its neutral position to either of its forward and reverse positions, the spring 292 holds the pin 290 in the lower end of the slot 282. After the lever 278 reaches its forward position or its reverse position, at which time the clutch means 216 is fully engaged in either its forward mode or its reverse mode, further movement of the link 286 causes the pin 290 to move upwardly or outwardly in the slot 282 and against the force of the spring 292. Thus, the slot 282, the pin 290 and the spring 292 permit overtravel of the link 286. During initial returning movement of the link 286, the spring 292 causes the pin 290 to move downwardly or inwardly in the slot 282. Thereafter, movement of the link 286 causes pivotal movement of the lever 278.

Figure 36:
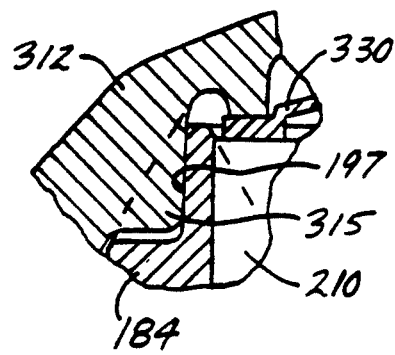
FIG. 36 is a view taken along line 36—36 in FIG. 34.

The stern drive unit 10 also comprises (see FIGS. 1, 5, 15, 26, 28 and 32) cover means covering substantially all of the upper gear housing 98. In the preferred embodiment, the cover means includes first and second plastic cover members 309 and 310 respectively covering the opposite side portions 103 and 106 of the upper gear housing 98, and third and fourth or upper and rear cover members 312 and 314 respectively covering the upper and rear portions 100 and 101 of the upper gear housing 98. The cover member 312 is preferably made of aluminum and has thereon (see FIG. 36) a projection or key 315 that extends downwardly into the recess 197 in the clutch housing 184. The cover member 314 is made of plastic and covers and affords access to the water pump 256. Preferably, the cover members 309, 310, 312 and 314 have finished exterior surfaces. The cover members 309, 310 and 314 cover substantially more than a majority of the upper gearcase 98.

As best shown in FIG. 15, the cover member 309 is secured to the side surface 103 of the upper gearcase 98 by a plurality of bolts 316. The cover member 310 is substantially a mirror image of the cover member 309 and is similarly secured to the side surface 106 of the upper gearcase 98. As shown in FIG. 34, the upper cover member 312 is mounted on the upper surface 100 of the upper gearcase 98 by four bolts 316a, and the rear cover member 314 is secured to the upper gearcase 98 by a bolt 316. As also shown in FIG. 34, a forward portion of the rear cover member 314 overlaps a rearward portion of the upper cover member 312, and a pair of bolts 316 extend through the overlapping portion of the cover member 314 and are threaded into the cover member 312. These bolts 316 constitute means extending through the overlapping portions of the cover members 312 and 314 for securing the cover member 314 to the cover member 312. Furthermore, the rear cover member 314 includes, on one side thereof, a forward side portion overlapping a rearward portion of the cover member 309, which rearward portion of the cover member 309 has therethrough three bolts 316. The forward side portion of the cover member 314 has thereon a forwardly extending tab 317 that extends into a complementary groove 317a in the cover member 309. The cover member 314 also includes, on the opposite side thereof, a forward side portion that is substantially identical to the above-described forward side portion and that includes a forwardly extending tab 317 that extends into a complementary groove 317a in the cover member 310. The mating tabs 317 and grooves 317a prevent outward movement of the forward side portions of the cover member 314.

The cover member 309 has therein (see FIGS. 17, 18 and 28) an endless groove 318 and has thereon an endless first rib 320 which is located adjacent and partially defines the groove 318 and which engages the gear housing 98, and has thereon a second rib 322 which is located in the groove 318. The reason for the groove and the ribs is explained hereinafter.

The stern drive unit 10 also comprises means for preventing rotation of the clutch housing 184 relative to the gear housing 98. While various suitable means can be used, in the illustrated construction, such means includes (see FIG. 7) the engaging flat portions 160 and 194 of the bearing housing 156 and the clutch housing 184. The means for preventing rotation of the clutch housing 184 also includes the recess or slot 197 in the clutch housing 184 and the key 315 on the cover member 312.

The stern drive unit 10 also comprises (see FIGS. 15, 17 and 18) means for forming a substantially water-tight chamber 324 containing the shift linkage 276 and the portion of the control shaft 238 located exteriorly of the gear housing 98. While various suitable means can be employed, in the preferred embodiment, such means includes (see FIGS. 15-18, 28 and 29) the first cover member 309, and an endless seal 326 surrounding the control shaft 238, the link 284, the lever 278 and the control housing 234 and extending between the cover member 309 and the gear housing 98. The endless seal 326 has therein a groove 328 and is seated in the groove 318 in the cover member 309, and the second rib 322 extends into the groove 328 in the seal 326. The seal 326 substantially prevents water from entering the chamber 324 between the cover 309 and the gear housing 98. The means for forming the chamber 324 also includes the seal 299 between the cable 296 and the pivot housing 66, and an O-ring 329 which is located between the pivot housing 66 and the upper gearcase 98 and which seals the joint between the recess 70 and the passageway 287. Thus, the chamber 324 includes the passageway 287 and the recess 70. The seal 299, the O-ring 329 and the seal 326 substantially prevent water from entering the chamber 324.

The means for forming the water-tight chamber 324 also includes means for securing the seal 326 to the cover member 309 without adhesives. Preferably, the means for securing the seal 326 to the cover member 309 without adhesives includes the grooves 318 and 328 and the rib 322.

The means for forming the water-tight chamber 324 also includes means for providing controlled compression of the seal 326. While various suitable means can be used, in the preferred embodiment, such means includes the first rib 320 on the cover member 309. The rib 320, which engages the gear housing 98, limits movement of the cover member 309 toward the gear housing 98 and thereby limits compression of the seal 326.

The stern drive unit 10 also comprises (see FIG. 7) means for lubricating the bearing means 162, 208, 210, 212, 214 and 265 and the bevel gears 164, 204, 206 and 264. In the preferred embodiment, this means includes a cover or plate 330 having therethrough a plurality of openings 332 and including an upper surface and a lower surface, and means for securing the cover 330 over the upper end of the clutch housing 184 with the lower surface of the cover 330 facing the clutch housing 184. While various suitable securing means can be used, in the illustrated construction, the securing means includes the cover member 312. More particularly, the cover 330 is sandwiched between the cover member 312 and the upper end of the clutch housing 184. This is best shown in FIGS. 5 and 7. Furthermore, engagement of the clutch housing 184 by the cover 330 also retains the clutch housing 184 in the recess 100a of the upper gearcase 98. Thus, the cover member 312 acts through the cover 330 to maintain proper location of the clutch housing 184 within the upper gearcase 98.

The stern drive unit 10 also comprises means including the upper surface of the cover 330 for defining a lubricant chamber 334 above the upper surface of the cover 330. Preferably, this means includes the cover member 312. In other words, the lubricant chamber 334 is defined between the cover member 312 and the cover 330.

The stern drive unit 10 further comprises (see FIG. 7) means for supplying lubricant to the lubricant chamber 334. In the preferred embodiment, the supplying means includes, in the upper and lower gearcases 98 and 109, a first passage 336 communicating between the centrifugal pump 148 and the bearing means 162, and a passage 338 which communicates between the bearing means 162 and the lubricant chamber 334 and which includes the recess 196 in the exterior surface 192 of the clutch housing 184. The supplying means also includes a passage 340 communicating between the lubricant chamber 334 and the bearing means 208 and 210. Preferably, the passage 340 includes the openings 332 in the cover 330, the axial drive shaft passage 202 and the upper radial drive shaft passage 203. Lubricant flows from the chamber 334 to the bearing means 208 via the openings 332, the passage 202 and the upper passage 203, and flows from the chamber 334 to the bearing means 210 via the openings 332. The supplying means also includes a passage 342 communicating between the lubricant chamber 334 and the bearing means 212 and 214. Preferably, the passage 342 includes the openings 332 in the cover 330, the axial drive shaft passage 202, and the lower radial drive shaft passage 203. Lubricant flows from the chamber 334 to the bearing means 212 via the openings 332, the passage 202 and the lower passage 203, and flows from the chamber 334 to the bearing means 214 via the bearing means 210 and past the bevel gear 264. Lubricant also flows through the opening 186 in the clutch housing 184 from the bearing means 162 to the bearing means 214.

The passage 338 communicating between the bearing means 162 and the lubricant chamber 334 and the passage 340 communicating between the lubricant chamber 334 and the bearing means 208 and 210 constitute a passage which communicates between the bearing means 162 and the bearing means 208 and 210 and a portion of which extends axially of the vertical drive shaft 166. The passage 338 communicating between the bearing means 162 and the lubricant chamber 334 and the passage 342 communicating between the lubricant chamber 334 and the bearing means 212 and 214 constitute a passage which communicates between the bearing means 162 and the bearing means 212 and 214, and a portion of which extends axially of the vertical drive shaft 166.

The supplying means also includes (see FIG. 7) a passage 344 which communicates between the lubricant chamber 334 and the bearing means 265 and which includes the recess 198 in the exterior surface 192 of the clutch housing 184. Lubricant in the chamber 334 flows through the recess 198 to the bearing means 265. Some of this lubricant also flows downwardly to the bearing means 214. Thus, the supplying means includes passage means communicating between the centrifugal pump 148 and the bearing means 162, 208, 210, 212, 214 and 265.

To summarize the lubricant system, the centrifugal pump 148 forces oil upwardly, through the first passage 336, to the bearing means 162 and to the bevel gear 164. The bevel gear 164 forces oil upwardly through the passage 338 and the recess 196 to the lubricant chamber 334. From the lubricant chamber 334, oil flows downwardly through the openings 332 in the cover 330 to the bearing means 210 and to the axial passage 202 in the drive shaft 166. From the drive shaft passage 202, oil flows outwardly through the radial passages 203 to the bearing means 208 and 212 and flows downwardly into the lower gearcase 109. Oil in the lubricant chamber 334 also flows downwardly through the passage 344 and the recess 198 to the bearing means 214 and 265 and to the bevel gear 264. Thus, the stern drive unit 10 comprises means for lubricating the rear bevel gear 264.

The stern drive unit 10 also comprises (see FIGS. 5 and 7) a dip stick 347 which is removably threaded into the upper cover member 312 and which extends through an opening in the cover 330 and downwardly into the axial passage 202 in the drive shaft 166.

The stern drive unit 10 also comprises (see FIGS. 1, 22, 23, 26 and 27) first and second extendable and contractable hydraulic assemblies 348 extending between the gimbal ring 54 and the gear housing 98 and respectively on opposite sides of the gear housing 98. Each hydraulic assembly 348 includes a cylinder 350, one end of which has therethrough a transverse bore 352 (FIG. 27). Each hydraulic assembly 348 also includes a piston (not shown) slideably housed in the cylinder 350, and a piston rod 354 having one end fixedly connected to the piston and an opposite end extending outwardly of the cylinder 350. The opposite end of the piston rod 354 has therethrough (see FIG. 22) a transverse bore 356.

The stern drive unit 10 also comprises (see FIG. 27) a shaft 358 extending through the bore 64 in the gimbal ring 54 and having a first end extending through the bore 352 in the cylinder 350 of the first hydraulic assembly 348 and a second end extending through the bore 352 in the cylinder 350 of the second hydraulic assembly 348. The stern drive unit 10 also comprises (see FIG. 22) a shaft 360 extending through the bore 107 in the upper gear housing 98 and having a first end extending through the bore 356 in the piston rod 354 of the first hydraulic assembly 348 and a second end extending through the bore 356 in the piston rod 354 of the second hydraulic assembly 348.

The stern drive unit further comprises bushing means surrounding the shafts 358 and 360 in the bores 64, 352, 107 and 356. More particularly, in the preferred embodiment, the bushing means includes a plastic bushing 362 (FIG. 27) surrounding the shaft 358, adjacent each end thereof, in the gimbal ring bore 64, a plastic bushing 364 (FIG. 27) surrounding the shaft 358 in the cylinder bore 352 of each hydraulic assembly 348, a plastic bushing 366 (FIG. 22) surrounding the shaft 360, adjacent each end thereof, in the upper gear housing bore 107, and a plastic bushing 368 surrounding the shaft 360 in the piston rod bore 356 of each assembly 348.

The stern drive unit 10 is operable in a low-speed range and in a high-speed range and further comprises means for maintaining a spaced relationship between the forward shaft 358 and the gimbal ring 54, between the forward shaft 358 and the cylinders 350, between the rearward shaft 360 and the upper gear housing 98, and between the rearward shaft 360 and the piston rods 354 only in the low-speed range of operation. For this purpose, the bushings 362 and 364 can be considered to be part of the shaft 358, and the bushings 366 and 368 can be considered to be part of the shaft 360. The means for maintaining a spaced relationship preferably includes elastomeric means surrounding the bushing means in the bores 64, 352, 107 and 356. The elastomeric means preferably includes an elastomeric member 370 (FIG. 27) surrounding a portion of each bushing 362, an elastomeric member 372 (FIG. 27) surrounding a portion of each bushing 364, an elastomeric member 374 (FIG. 22) surrounding a portion of each bushing 366, and an elastomeric member 376 (FIG. 22) surrounding a portion of each bushing 368.

As shown in FIGS. 22 and 27, each of the bores 54, 107, 352 and 356 preferably includes a frustoconical portion in which the associated elastomeric member is seated. Furthermore, the bushings 362, 364, 366 and 368 are preferably split bushings. During assembly, each of the bushings 362, 364, 366 and 368 and the surrounding elastomeric member 370, 372, 374 or 376 is pushed into the frustoconical portion of the associated bore 64, 107, 352 or 356 so that the surrounding elastomeric member compresses the bushing around the associated shaft and takes up all of the shaft, bushing and housing tolerances.

During low-speed operation of the stern drive unit 10, propeller thrust is transmitted from the upper gear housing 98 to the gimbal ring 54 via the elastomeric members 370, 372, 374 and 376, the bushings 362, 364, 366 and 368, the shafts 358 and 360 and the hydraulic assemblies 348. In other words, the elastomeric members maintain a spacing between each of the shafts and the surrounding structure. Propeller thrust is transmitted between the shafts and the surrounding structure only through the elastomeric members. FIG. 22 shows thrust being transmitted from the gear housing 98 to the piston rod 354 via the elastomeric member 374, the bushing 366, the shaft 360, the bushing 368 and the elastomeric member 376. Thrust is transmitted between the bushing 366 and the gear housing 98 only by the elastomeric member 374, and thrust is transmitted between the bushing 368 and the piston rod 354 only by the elastomeric member 376.

As propeller thrust increases, the spaced relationship between each of the bushings 362, 364, 366 and 368 and the surrounding structure, and between each of the shafts 358 and 360, where the shafts are not surrounded by bushings, and the surrounding structure, is gradually eliminated, because the elastomeric members 370, 372, 374 and 376 become compressed. Thus, the stern drive unit 10 comprises means for gradually eliminating the spaced relationship in response to increasing propeller thrust. Alternatively stated, the stern drive unit 10 comprises means for selectively engaging the shaft 358 and the gimbal ring 54, the shaft 358 and the hydraulic assemblies 348, the shaft 360 and the upper gearcase 98, and the shaft 360 and the hydraulic assemblies 348, all in response to increasing propeller thrust.

During high-speed operation of the stern drive unit 10, propeller thrust compresses the elastomeric members enough so that the shafts or the bushings, or both, contact the surrounding structure and thrust is no longer transmitted through the elastomeric members. For example, if the bushings contact the surrounding structure before or simultaneously with the shafts, propeller thrust is transmitted directly between the upper gear housing 98 and the bushing 366 (see FIG. 23), between the bushing 368 and the piston rod 354, between the cylinder 350 and the bushing 364 and between the bushing 362 and the gimbal ring 54.

The stern drive unit 10 also comprises (see FIG. 5) means for severing the vertical drive shaft 166 upon the application of a predetermined torque to the vertical drive shaft 166, e.g., when the propeller 140 strikes an underwater obstruction. While various suitable severing means can be used, in the illustrated construction, the vertical drive shaft 166 has an attenuated portion 378 between the upper and lower ends of the shaft 166, and the severing means includes the attenuated portion 378 of the drive shaft 166. Preferably, the attenuated portion 378 of the drive shaft 166 has therein a transverse bore 380. In one alternative embodiment of the invention, which alternative embodiment is shown in FIG. 31, the drive shaft 166 has a maximum outside diameter 382, and the attenuated portion 378 of the drive shaft 166 has an outside diameter 384 less than the maximum outside diameter 382.

A second alternative embodiment of the invention is illustrated in FIG. 32. Except as described hereinafter, the second alternative embodiment is substantially identical to the preferred embodiment, and common elements have been given the same reference numerals. In the second alternative embodiment, the means for introducing water into the exhaust passageway 266 includes a conduit 400 communicating with a forwardly facing portion of the lower gear housing 109 and with the exhaust passageway 266. More particularly, the lower gear housing 109 has therein a passageway 402 and a plurality of passages 404 communicating between the forwardly facing portion of the gear housing 109 and the passageway 402, and a flexible conduit 406 communicates between the passageway 402 and the exhaust passageway 266. Forward movement of the stern drive unit 10 through the water forces water into the passages 404 and through the passageway 402 and the conduit 406 to the exhaust passageway 266.

Various features of the invention are set forth in the following claims.

We claim:

1. A marine propulsion device comprising a gear housing adapted to be mounted on the transom of a boat, first bearing means supported by said gear housing, a first gear which is rotatably supported by said first bearing means and which is adapted to be driven by an engine, a vertical drive shaft having a lower end, second and third bearing means supported by said gear housing, second and third gears which mesh with and are driven by said first gear and which are respectively supported by said second and third bearing means for rotation relative to said vertical drive shaft, clutch means for causing selective and alternative driving engagement of said second and third gears with said vertical drive shaft, a fourth gear driven by said lower end of said vertical drive shaft, a propeller shaft which has a forward end, which is rotatably supported by said gear housing and which is adapted to have mounted thereon a propeller, a fifth gear which is drivingly mounted on said forward end of said propeller shaft; which meshes with, is driven by and is located forwardly of said fourth gear and which has thereon a centrifugal pump, and means for lubricating at least one of said first, second and third bearing means and including passage means communicating between said centrifugal pump and said one of said first, second and third bearing means.

2. A marine propulsion device as set forth in claim 1 wherein said lubricating means includes a first passage communicating between said centrifugal pump and said first bearing means, a second passage communicating between said first bearing means and said second bearing means and a third passage communicating between said first bearing means and said third bearing means.

3. A marine propulsion device as set forth in claim 2 wherein a portion of each of said second and third passages extends axially of said vertical drive shaft.

4. A marine propulsion device as set forth in claim 1 wherein said lubricating means also includes a cover having therethrough a plurality of openings and having upper and lower surfaces, means for securing said cover above said second gear with said lower surface facing said second gear, means including said upper surface of said cover for defining a lubricant chamber above said upper surface, and means for supplying lubricant to said lubricant chamber.

5. A marine propulsion device as set forth in claim 4 wherein said means for supplying lubricant to said lubricant chamber includes a passage communicating between said centrifugal pump and said first bearing means and a passage communicating between said first bearing means and said lubricant chamber.

6. A marine propulsion device as set forth in claim 5 wherein said lubricating means also includes a passage communicating between said chamber and said second bearing means and a passage communicating between said chamber and said third bearing means.

7. A marine propulsion device as set forth in claim 1 and further comprising a clutch housing which is supported by said gear housing, which supports said second and third bearing means, and which has an exterior surface, and wherein said lubricating means includes a recess located in said exterior surface adjacent said first gear.

8. A marine propulsion device as set forth in claim 7 wherein said first gear forces lubricant through said recess.

9. A marine propulsion device as set forth in claim 8 wherein said recess is located above said first gear.

10. A marine propulsion device comprising a gear housing adapted to be mounted on the transom of a boat, a horizontal drive shaft having a forward end adapted to be driven by an engine and having a rearward end, first bearing means supported by said gear housing, a first gear which is rotatably supported by said first bearing means and which is driven by said rearward end of said horizontal drive shaft, a vertical drive shaft having a lower end, a clutch housing which is supported by said gear housing and which includes an exterior surface having therein a recess adjacent said first gear, second and third bearing means supported by said clutch housing, second and third gears which mesh with and are driven by said first gear and which are respectively supported by said second and third bearing means for rotation relative to said vertical drive shaft, clutch means for causing selective and alternative driving engagement of said second and third gears with said vertical drive shaft, a fourth gear driven by said lower end of said vertical drive shaft, a propeller shaft which has a forward end, which is rotatably supported by said gear housing and which is adapted to have mounted thereon a propeller, a fifth gear which is drivingly mounted on said forward end of said propeller shaft and which meshes with, is driven by and is located forwardly of said fourth gear, and means for lubricating said first, second and third bearing means and including passage means which communicates with said first, second and third bearing means and which includes said recess.

11. A marine propulsion device as set forth in claim 10 wherein said passage means includes a first passage communicating with said first bearing means, a second passage communicating between said first bearing means and said second bearing means and a third passage communicating between said first bearing means and said third bearing means.

12. A marine propulsion device as set forth in claim 11 wherein a portion of each of said second and third passages extends axially of said vertical drive shaft.

13. A marine propulsion device as set forth in claim 10 wherein said lubricating means also includes a cover having therethrough a plurality of openings and having upper and lower surfaces, means for securing said cover above said second gear with said lower surface facing said second gear, means including said upper surface of said cover for defining a lubricant chamber above said upper surface, and means for supplying lubricant to said lubricant chamber.

14. A marine propulsion device as set forth in claim 13 wherein said recess communicates between said first bearing means and said lubricant chamber.

15. A marine propulsion device as set forth in claim 14 wherein said passage means also includes a passage communicating between said chamber and said second bearing means and a passage communicating between said chamber and said third bearing means.

16. A marine propulsion device as set forth in claim 10 wherein said first gear forces lubricant through said recess.

17. A marine propulsion device as set forth in claim 16 wherein said recess is located above said first gear.

18. A marine propulsion device comprising a gear housing adapted to be mounted on the transom of a boat, a horizontal drive shaft having a forward end adapted to be driven by an engine and having a rearward end, first bearing means supported by said gear housing, a first gear which is rotatably supported by said first bearing means and which is driven by said rearward end of said horizontal drive shaft, a vertical drive shaft having a lower end, second and third bearing means supported by said gear housing, second and third gears which mesh with and are driven by said first gear and which are respectively supported by said second and third bearing means for rotation relative to said vertical drive shaft, clutch means for causing selective and alternative driving engagement of said second and third gears with said vertical drive shaft, a fourth gear driven by said lower end of said vertical drive shaft, a propeller shaft which has a forward end, which is rotatably supported by said gear housing and which is adapted to have mounted thereon a propeller, a fifth gear which is drivingly mounted on said forward end of said propeller shaft, which meshes with, is driven by and is located forwardly of said fourth gear and which has thereon a centrifugal pump, fourth bearing means supported by said gear housing, a sixth gear which is rotatably supported by said fourth bearing means and which meshes with and is driven by said second and third gears, and means for lubricating said first, second, third and fourth bearing means and including passage means communicating between said centrifugal pump and said first, second, third and fourth bearing means.

19. A marine propulsion device as set forth in claim 18 wherein said lubricating means includes a first passage communicating between said centrifugal pump and said first bearing means, a second passage communicating between said first bearing means and said second bearing means, a third passage communicating between said first bearing means and said third bearing means and a fourth passage communicating between said first bearing means and said fourth bearing means.

20. A marine propulsion device as set forth in claim 19 wherein a portion of each of said second and third passages extends axially of said vertical drive shaft.

21. A marine propulsion device as set forth in claim 18 wherein said lubricating means also includes a cover having therethrough a plurality of openings and having upper and lower surfaces, means for securing said cover above said second gear with said lower surface facing said second gear, means including said upper surface of said cover for defining a lubricant chamber above said upper surface, and means for supplying lubricant to said lubricant chamber.

22. A marine propulsion device as set forth in claim 21 wherein said means for supplying lubricant to said lubricant chamber includes a passage communicating between said centrifugal pump and said first bearing means and a passage communicating between said first bearing means and said lubricant chamber.

23. A marine propulsion device as set forth in claim 22 wherein said lubricating means also includes a passage communicating between said chamber and said second bearing means, a passage communicating between said chamber and said third bearing means, and a passage communicating between said chamber and said fourth bearing means.

24. A marine propulsion device as set forth in claim 18 and further comprising a clutch housing which is supported by said gear housing, which supports said second and third bearing means, and which has an exterior surface, and wherein said lubricating means includes a recess located in said exterior surface adjacent said first gear and a recess located in said exterior surface adjacent said sixth gear.

25. A marine propulsion device as set forth in claim 18 and further comprising a water pump driven by said sixth gear.

* * * * *